US005796727A

United States Patent [19]

Harrison et al.

[11] Patent Number: 5,796,727
[45] Date of Patent: Aug. 18, 1998

[54] WIDE-AREA WIRELESS LAN ACCESS

[75] Inventors: Colin George Harrison, Brookfield, Conn.; Dieter Jaepel, Richterswil, Switzerland

[73] Assignee: International Business Machines Corporation, Armonk, N.Y.

[21] Appl. No.: 56,285

[22] Filed: Apr. 30, 1993

[51] Int. Cl.[6] .................................................. H04Q 7/24
[52] U.S. Cl. ..................... 370/338; 370/349; 370/913; 455/436; 455/445; 455/557
[58] Field of Search ...................... 379/58, 59, 60, 379/63, 165, 220; 455/33.1, 33.2, 53.1, 54.1, 56.1, 422, 426, 436, 445, 507, 517, 518, 520, 557; 370/85.1, 85.13, 94.1, 94.3, 328, 329, 336, 338, 349, 400, 401, 406, 911, 913

[56] References Cited

U.S. PATENT DOCUMENTS

| | | | |
|---|---|---|---|
| 4,807,222 | 2/1989 | Amitay | 370/85 |
| 4,901,340 | 2/1990 | Parker et al. | 379/60 |
| 4,939,726 | 7/1990 | Flammer et al. | 370/400 |
| 5,105,197 | 4/1992 | Clagett | 342/419 |
| 5,127,041 | 6/1992 | O'Sullivan | 455/557 |
| 5,276,680 | 1/1994 | Messenger | 370/311 |
| 5,315,637 | 5/1994 | Breeden et al. | 455/435 |
| 5,384,826 | 1/1995 | Amitay | 455/436 |

OTHER PUBLICATIONS

IBM Tech. Discl. Bulletin vol. 34 #4A Sep. 1991 p. 243 "System For Integrating Lap-Top Computers Into Users' Environments" Agnew et al.

*Primary Examiner*—Benedict V. Safourek
*Attorney, Agent, or Firm*—Ronald L. Drumheller; Jack M. Arnold

[57] ABSTRACT

A method and apparatus is provided which permits mobile computers equipped with modems for cellular telephone systems to obtain various classes of data communication services, as well as voice service, including taking part in local-area networks. The LAN's may be composed of conventional LANS in establishments or of other mobile computers. In this way, mobile computers can take part in mainstream client-server computing and also establish wireless LANs using the cellular telephone system.

58 Claims, 20 Drawing Sheets

WIDE-AREA WIRELESS LAN ACCESS

FIELD OF THE INVENTION

This invention relates generally to data communications, and in particular to wireless networks. Specifically, the invention is directed to providing mobile computers with modems for cellular telephone systems the ability to obtain various classes of data communication services, voice service, and the capability to take part in Local Area Networks (LAN's).

The acronyms below are used in the following description.

| ACRONYMS | |
|---|---|
| CC | Cell Controller |
| ISDN | Integrated Services Digital Network |
| LAN | Local-Area Network |
| LLC | Logical Link Control |
| MAC | Media-Access Control |
| MDSC | Mobile Data Service Controller |
| MTSO | Mobile Telephone Service Office |
| PC | Personal Computer |
| PHYS | Physical |
| PSTN | Public Switched Telephone Network |
| MS | Mobile Station |
| WAB | Wide-Area Bridge |
| WAN | Wide-Area Network |
| WS | Workstation |
| NM | Network Manager |
| NC | Network Controller |

BACKGROUND OF THE INVENTION

The strongest growth area for PCs (and soon for WSs) is in portable systems, where unit shipments are projected to exceed 25 million per year by 1995. Portability generally implies untethered use and various vendors have begun to develop "wireless LAN access" products. These are based on both RF and infrared, and aim to provide within buildings a high bandwidth wireless connection to a backbone LAN, thus enabling the portables to continue to take part in LAN-based computing.

Client-server and peer-to-peer applications which are widely available for PCs and WSs are written on the assumption of access within the PC or WS to one of a small number of communication protocol stacks, which in turn operate with one of a small number of physical layers. Standardization in this area has been highly successful and end-users are accustomed to buying 'shrink-wrap' software packages with network applications and installing them on their PCs.

It seems equally desirable that portables retain LAN-access when they leave the establishment. The most accessible networks for wire-area communication are the public telephone networks. However the primary service offered for PC data by telephones is a serial line connection, which still leaves the PC tethered. By connecting a 2400 Baud modem to a cellular telephone set, a mobile serial line connection can be obtained, but the quality of service is extremely poor. Future digital cellular and cordless telephone systems will offer bandwidths around 8 kbps in the near-term, rising to ISDN basic service (144 kbps) by 2000 (RACE UMTS). (Private wireless wide-area networks such as ARDIS do provide computer network connectivity. However, the protocols available are relevant primarily for mainframe connectivity (LU6.2), and for economic reasons it is unlikely that the bandwidths of these networks will improve in the same way that digital cellular bandwidths are expected to improve.)

U.S. Pat. No. 5,105,197 to Clagett discloses a method and system for providing mobile access to message delivery into the existing public communications network. A portable handset and transceiver have storage capacity and a processor for digitizing and time compressing messages inputted by the operator into the handset. Upon command of the handset operator, the stored message is transmitted to a fixed site transceiver having storage capacity. The two transceivers are locked into communication by suitable handshake protocols. The fixed site transceiver is linked to the public switched telecommunications network and delivers the message stored in the fixed site storage to voice messaging service storage in the public communications network. The message thus stored is either delivered as by call completion service or retrieved by the addressee as in voice mail service. In both cases, the signal from the VMS storage is processed to perform digital to analog conversion along with time decompression or expansion. The addressee, handling procedures, and billing information are incorporated into the original message in the handset transceiver. Periodic beacon signals may be provided at the fixed site transceiver to facilitate location thereof by the portable handset and transceiver.

U.S. Pat. No. 4,901,340 to Parker et al discloses a technique for enabling a peregrinating Cellular Mobile Radiotelephone (CMR) subscriber to automatically receive, in a foreign service area (that is, an area outside his home service area), calls placed to his MID at his home service area. A roaming processor is coupled through a cable or LAN to a switch associated with a foreign MTSO and is coupled, preferably through a private data network, to a switch associated with the subscriber's home MTSO. Within the roaming processor resides a program that detects the reception at the foreign switch of a predetermined code indicating that calls placed to the roamer's home MID are to be forwarded to the foreign MTSO. Subsequent to the "validation" of the roamer and to the performance of certain software housekeeping tasks, the roamer is assigned a Temporary Directory Number (TDN) for use in the remote service area. The FMR processor then commands the subscriber's home MTSO switch to forward calls, placed to the subscriber's MID at the home MTSO, to the TDN. Calls are subsequently forwarded, via the PSTN, from the subscriber's home MTSO to the foreign MTSO.

U.S. Pat. No. 4,807,222 to Amitay discloses a high-speed high-capacity Local Area Network (LAN) wherein each user, of a separate group of one or more of the network users, communicates cordlessly, using radio frequencies or infrared, with an assigned Regional Bus Interface Unit (RBIU) located in the proximity of the group. Each RBIU of the network interfaces with a high-speed serial or lower speed parallel bus of an open-ring network for purposes of transmitting information signals while receiving information signals via the high-speed serial network bus(es). Various communications protocols such as, for example, CSMA/CD, slotted ALOHA, etc. can be employed by the users in communicating with the associated RBIUS with high efficiency due to the short paths involved relative to the transmission frame durations used on the bus.

IBM TDB Vol. 34, No. 4A, September 1991 at pages 243–244 discloses a software system that allows a lap-top computer user to see a single coherent system, rather than a collection of unrelated parts. The system includes the user's lap-top, other users' lap-tops, desk-top computers, file servers and other nearby devices such as printers and FAX machines. The disclosed software ensures a consistent view of all files, a complete view of available computers and devices, and an easy to use method for communicating with nearby computers and devices.

OBJECTS OF THE INVENTION

It is an object of this invention to provide LAN communication via a cellular telephone system among portable computers equipped with suitable modems for the cellular telephone system and also with establishment LANs.

Although LAN communication is viewed as an important service to be added to future cellular telephone systems, it is also desirable to support other communication methods commonly employed by PCs. These include serial-line, CCITT Group 3 and 4 facsimile, and ISDN. It is therefore an object of this invention to permit support of a range of data services for a portable computer equipped with a cellular telephone modem.

DISCLOSURE OF THE INVENTION

A method and apparatus is described for mobile computers equipped with modems for cellular telephone systems to obtain various classes of data communication services, as well as voice service, including taking part in local-area networks. The LAN's may be composed of real LANs in establishments or of other mobile computers. In this way, mobile computers can take part in mainstream client-server computing and also establish ad hoc wireless LANs using the cellular telephone system.

DESCRIPTION OF THE PREFERRED EMBODIMENT

Figure 1:
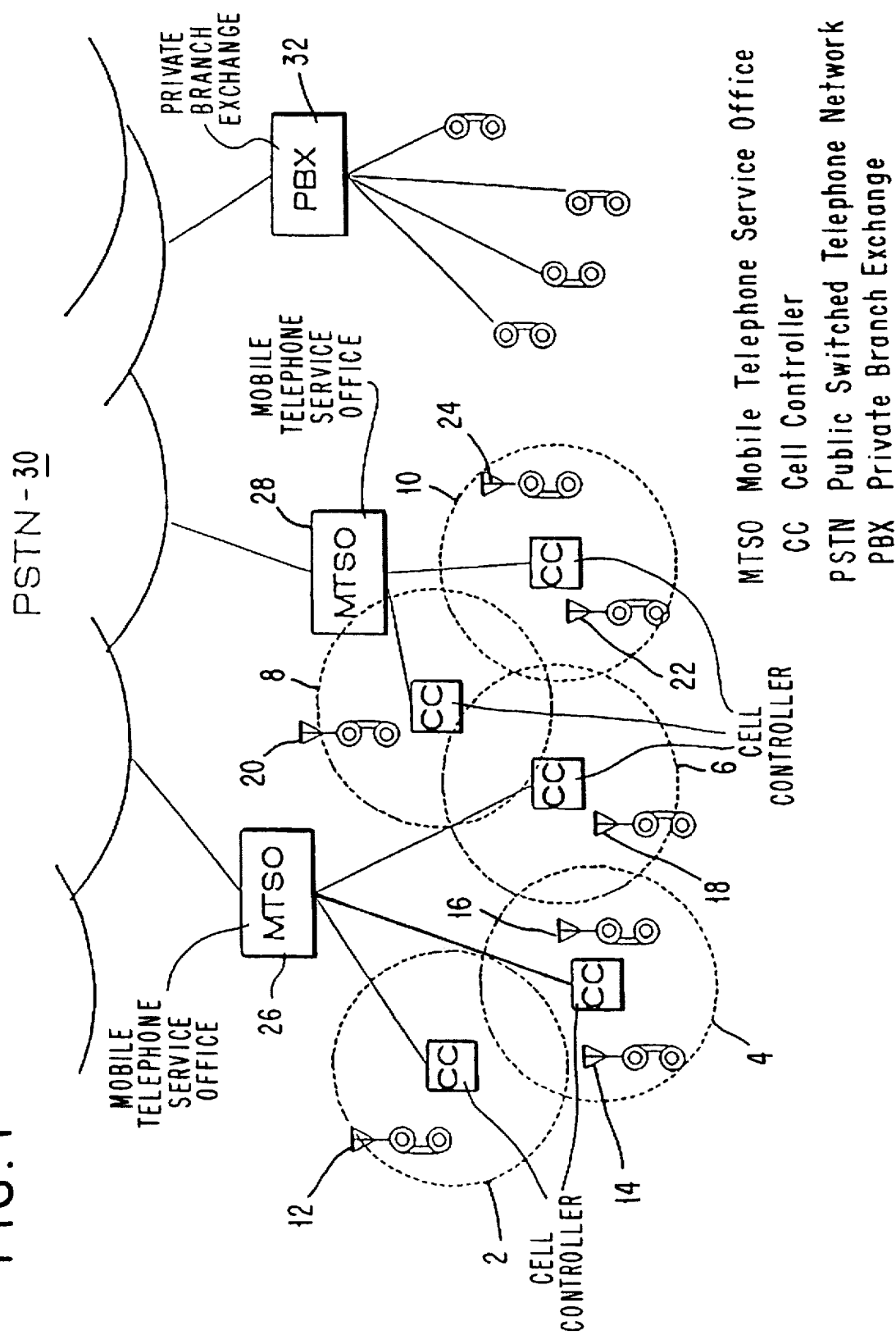
FIG. 1 is a diagram of a cellular telephone structure.

It is necessary to first describe the basic operation of a (digital) cellular telephone system, which is illustrated in FIG. 1. The system consists of cell sites 2, 4, 6, 8 and 10, where RF antennas 12, 14, 16, 18, 20, 22 and 24 are located together with RF electronics for the transmission and reception of signals. There are also control sites 26 and 28, called Mobile Telephone Service Offices (MTSO). Each antenna provides coverage over an area commonly called the cell. In current U.S. analogue cellular systems, the cell is approximately 3 miles in diameter. In future digital systems, the cell may be as small as 1000–1200 feet in diameter. In some cases the cell site also contains some control intelligence, which takes part in allocating channels to users, controlling access, billing and so forth. In other cases, the cell control function is centralized in the MTSO. High bandwidth lines relay signals between the cell sites and the MTSO.

An MTSO controls several cells, indeed a single MTSO may provide service for an entire city. In addition to the cell control functions, the MTSO provides the connection to the public switched telephone network 30 for communication with standard telephone facilities such as a Private Branch Exchange (PBX) 32. It provides signalling operations on behalf of the cellular telephones in its cells, to perform call set up and clear. The MTSO is also responsible for reporting to the roaming system manager what cellular telephones are present in its cells. The roaming manager can then use this information to locate mobile telephones throughout the network.

This invention is particularly applicable to digital cellular telephone systems. In principle, it may operate also with analogue systems; however the bandwidth of these systems is too low to be very useful. In a digital cellular system, it is important to note that the MTSO's 26 and 28 each contains a fast packet switch. The switch serves to route packets of (voice) data between the various cells 2, 4, 6, 8 and 10 and the PSTN 30. The invention supposes that the cellular system can intrinsically provide the following services:

1. Media access control, registration, channel/bandwidth allocation and wireless packet transport: including error checking and correction and packet acknowledgement. These are basic functions required already for voice use.

2. Recognition of classes of service, so that a PC can indicate that it wishes to use a data service class. There may be many such classes:
    a. Serial connection
    b. ISDN connection
    c. CCITT Group 3 facsimile
    d. IEEE 802.x LANs
    e. Appletalk LAN
    f. and so on and so forth . . .

A given MS may employ one or more classes of service concurrently, including voice service, since it can indicate in each packet the required service class. The class of service may have implications for media access, billing and various other functions, but in particular, it can be used by the MTSO switch to route data between the cells and a set of functions called the "Mobile Data Service Controller" (MDSC). For each distinct class of service or group of classes, an appropriate MDSC should be provided with the functions required to implement that class of service.

Figure 2:
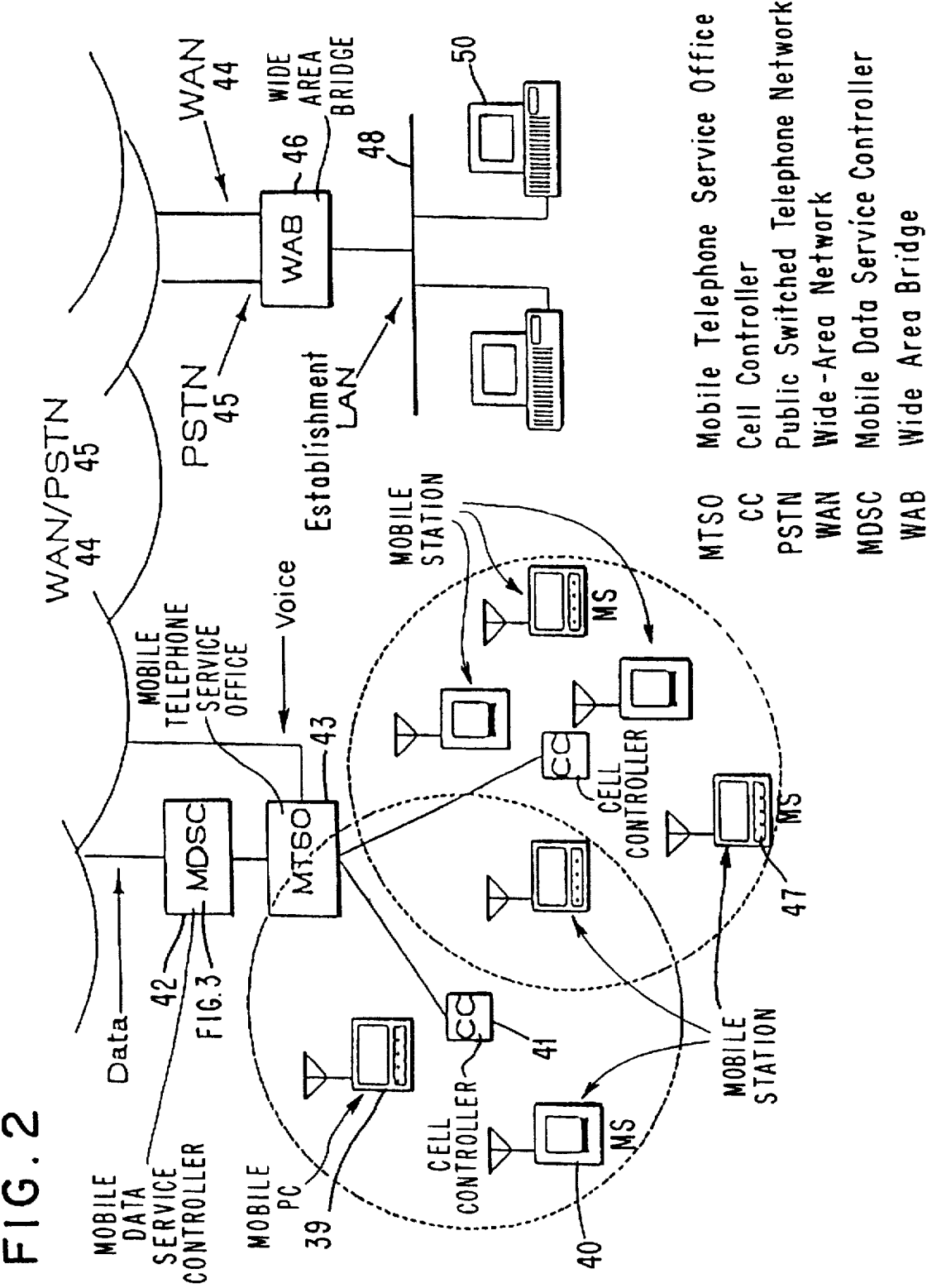
FIG. 2 is a diagram of a cellular LAN-access structure.

Refer now to FIG. 2. The cellular system is employed for the purposes of the wide-area wireless LAN primarily to provide point to point links between mobile PCs 39 or Mobile Stations (MS) 40 and a MDSC 42 via MTSO 43. The MDSC 42 is responsible for instantiating the local LAN and providing wide-area bridging to the remote LANs. This invention is concerned primarily with a MDSC 42 to support IEEE LANs. The MDSC 42 communicates through a wide-area network (WAN) 44 or PSTN 45 either to another MDSC or to a Wide-Area Bridge (WAB) 46. The WAB 46 provides bridging between the WAN 44 and an establishment LAN 48. In the case where the WAN 44 is an ISDN, the WAB 46 is effectively the LAN/ISDN bridge described in an article titled "LAN/ISDN Interconnect via Frame Relay"; Proceedings of the IEEE Global Telecommunications Conference, pp. 1791-1797, Nov. 28-Dec. 1, 1988, by Dieter Jaepel et al.

The MS 40 is a PC equipped with a modem which provides the MAC and PHYS layers of the wireless link. Each MS 40 is identified by two telephone numbers. One is employed for speech services and the other for data services. One or both may be used for billing purposes and both must be tracked by the cellular system's roaming manager. The MS 40 also has a MAC address, which is used for LAN addressing.

Figure 3:
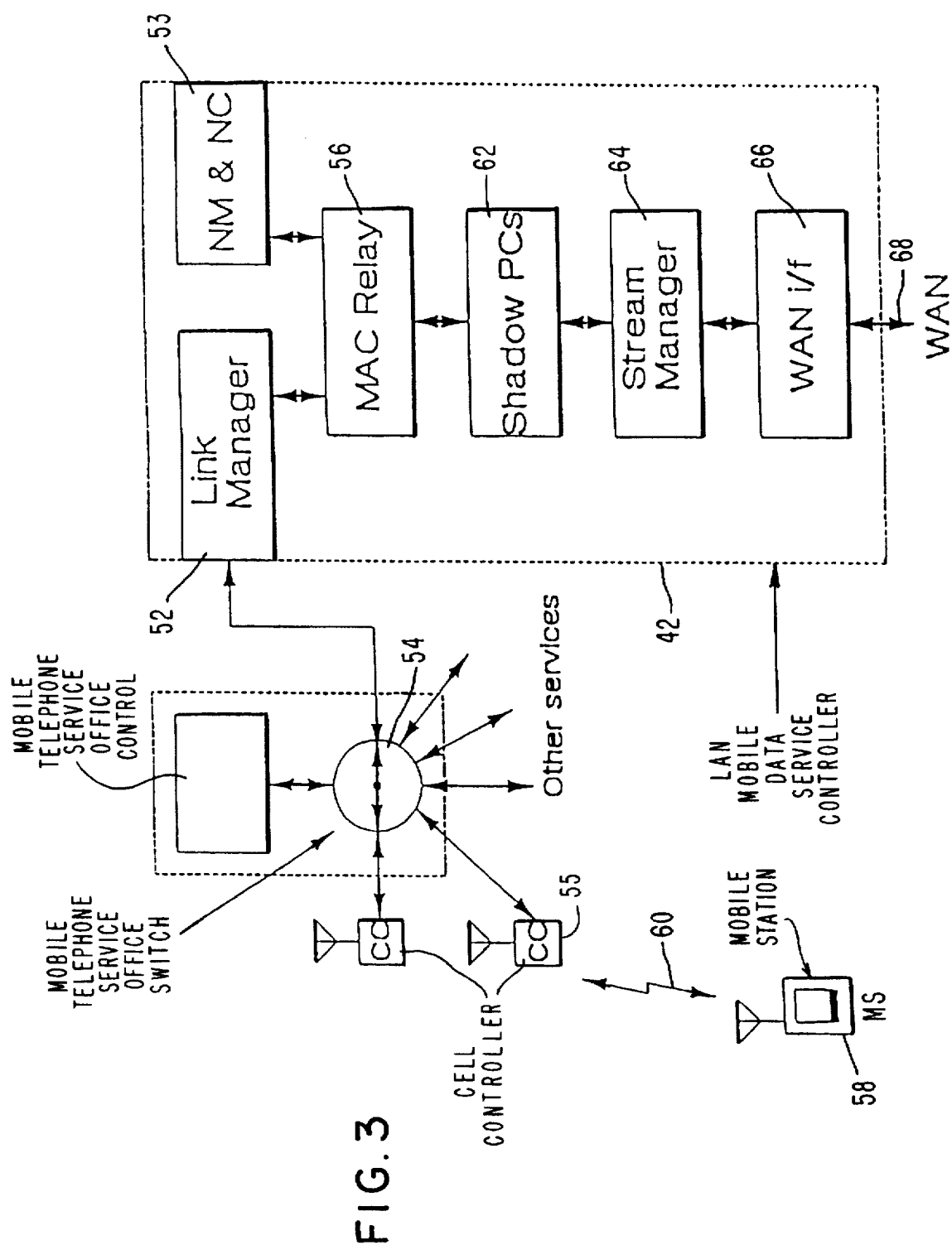
FIG. 3 is a block diagram which includes details of the MDSC which is shown generally in FIG. 2.

In many respects the LAN MDSC resembles the base station function in a conventional wireless LAN access system and provides many of the same services. However, it also must provide additional services, because its backbone network is not a LAN, but a WAN, or possibly several different WANs. As shown in FIG. 3, the LAN MDSC 42 extends the functions of the MTSO by providing the following new functions:

1. Link Manager 52: This function manages each communication session across the wireless link. For in-bound data, it accepts a data stream from a MTSO switch 54, and re-assembles the wireless MAC frames to produce a LAN MAC frame. For out-bound data, it fragments the LAN MAC frame into wireless MAC frames, and hands off the wireless frame to the MTSO switch. This region of the MDSC may also provide additional data services such as compression and encryption and a more secure form of access control than that performed by the cell controller.

2. MAC Relay 56: This function forwards LAN MAC frames among two groups of PC under control of a Network Manager (NM) and a Network Controller (NC):
   a. MSs 58 in cells which are controlled by the same MTSO 54. In this case, the LAN MAC frames are simply relayed back to the outbound Link Manager function and delivered via the MTSO switch to the appropriate cell and then via wireless link 60 to the destination MS 58. These local MAC Frames may also be relayed via a Shadow PC in the MDSC if the two MSs require additional support.
   b. Fixed or mobile systems which are connected to the MDSC via the WAN. These may be other MSs in another MTSO or PCs attached to a real LAN at an establishment. In this case, the LAN MAC frames may be relayed to so-called "Shadow PCs" 62 (see below), which provide specialized services in support of WAN traffic 68.

Some of the wireless MAC frames received will be control messages, for control functions of the wireless link, such as registration, bandwidth requests, and so forth, for control functions of the WAN, such as call set up request, telephone numbers, capacity request and so forth or for network control or network management functions of the MTSO's "LAN". The MAC Relay function can inspect each frame to see if it is a control message and forward it accordingly. The MAC Relay function performs essentially a conventional MAC bridge operation.

3. Shadow PCs 62: These are virtual systems, which are connected on one side to the MAC Relay and on the other side to a Stream Manager function 64. This function provides various services related to moving MAC frames between the MAC Relay in the MDSC and the MAC Relay in the WAB. The function also provides platform for the provision of local virtual personal computer services, which enables the MDSC to enhance the performance or capabilities of the MSs. These services include:
   a. Directory management for each MS. There is one Shadow PC per MS in the MTSO.
   b. Conversion between LAN MAC frames and frames appropriate for the WAN 68.
   c. Suspend/Resume or surrogate functions on behalf on the MS when it is temporarily out of contact with the cell.
   d. user-specific valued-added services can be attached here. For example, there may be support for a "User Context", which is a collection of data and applications in active use by a user and which exceed the storage or computational capacity of the MS and for which access through the WAN would impose too long a delay. This User Context should follow the user from MTSO to MTSO. The MDSC then provides storage and computational services to the MS in a client-server model. The Shadow PC may also provide local transformations, to support, for example, different types of displays on the MSs, from those expected by the remote services.
   e. Exchanging control messages with the WAB, for example to notify the WAB that the Shadow PC's MS is about to move to a new MTSO with a different telephone number.

The Shadow PC contains certain state information for each MS. If the MS must be handed off between two MTSOs, this state information must be transferred to the receiving MDSC.

4. Stream Manager 64: It may occur that multiple MSs at a given MTSO wish to communicate through the same WAB to multiple other PCs. This function aggregates data streams between these MSs and the WAB into a single data stream through the WAN.

This function can also detect when a request is received to connect to a WAB for which a connection is already established.

5. WAN interface 66: This performs the WAN-specific signalling for call set up and so forth and delivers and accepts WAN frames over the various connections. The Stream Manager is responsible for aging the various connections established with the WAN, so that if there is no traffic on a given connection over a certain period, the connection will be dropped. If new traffic appears for that connection, the WAN interface has to re-establish it.

Figure 4:
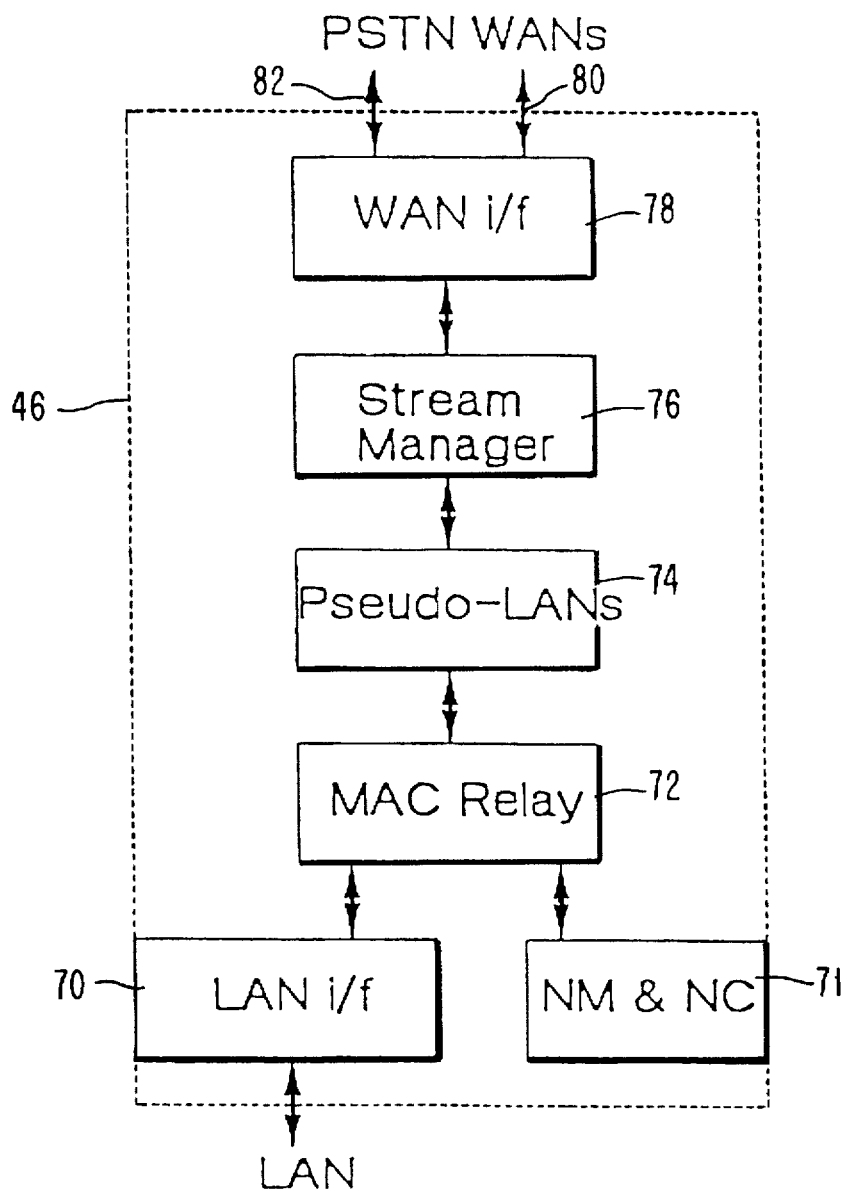
FIG. 4 is a block diagram of the WAB which is shown generally in FIG. 2.

The WAB 46 (FIG. 2) provides dial-up connections between the establishment LAN 48 and one or more MTSOs, each of which is effectively a remote or wide-area LAN, from the point of view of the establishment LAN. (Note that WABs 46 may also connect through the WAN 44 to connect establishment LANs.) The principal functions of the WAB 46 are shown in FIG. 4. They are as follows:

1. LAN interface 70: This is the LAN adapter and device driver.
2. The MAC Relay function 72, which is effectively a half bridge between the establishment LAN and the "pseudo-LANs", and which operates under control of a Network Manager (NM) and a Network Controller (NC).
3. Each pseudo-LAN 74 represents a connection to an MTSO and performs various functions for the wide-area LAN on behalf of the WAB 46. These include:
    a. LAN Surrogate: The pseudo-LAN acts as a surrogate for the wide-area LAN in network management and other global functions.
    b. Directory Manager: The pseudo-LAN maintains the directory of the MSs connected to this WAB in the given MTSO.
4. Stream Manager 76: Just as in the MDSC, all sessions between establishment PCs and MSs in a given MTSO are passed through a common WAN channel.
5. WAN interface 78: The WAN interface 78 performs signalling and other functions required to establish connections through one or more WANs 80 to the required MTSO and MSs. This interface also includes a connection to a PSTN 82, which is used as described below for locating an MS within the cellular network.

Operation of the Wide-Area wireless LAN

End-end protocol

Returning to FIG. 2, data originating at an MS 40 may be transmitted to either

1. An MS 47 in the same MTSO 43, or
2. An MS in a different MTSO or a fixed host attached to an establishment LAN 48.

(The reverse flow is of course also supported in each case.) In the first case (communication within the same MTSO), the flow is:

1. The source MS's 40 protocol stack produces an IEEE 802.2 LLC frame which is wrapped to make, say, an 802.3 LAN MAC frame.
2. The source MS 40 fragments the LAN MAC frame in the wireless link MAC layer and wraps it to make wireless MAC frames, entering the address of the LAN MDSC as the destination.
3. The source MS 40 transmits the wireless MAC frames on the wireless link according to its protocol.
4. A CC 41 receives the wireless signal and demodulates it to extract the wireless MAC frame.
5. The CC 41 passes the wireless MAC frames to the MTSO switch 54 (FIG. 3).
6. The MTSO switch 54 relays the wireless MAC frames to the LAN MDSC 42 (based on the type of service indicated).
7. The MDSC's Link Manager 52 (FIG. 3) strips the wireless MAC wrappers from the wireless MAC frames and re-assembles the LAN MAC frame.
8. The MAC Relay 56 (FIG. 3) examines the MAC frame and determines that the destination MAC address is in this MTSO (based on directory entries). The MAC Relay 56 returns the LAN MAC frame to the Link Manager 52 (FIG. 3).
9. The Link Manager 52 fragments the LAN MAC frame and wraps it to make wireless MAC frames, entering the address of the appropriate CC as the destination.
10. The Link Manager 52 relays the wireless MAC frames through the MTSO switch 54 to the appropriate CC 55 (FIG. 3).
11. The CC 55 transmits the wireless MAC frames on the wireless link 60 (FIG. 3) according to its protocol.
12. The receiving MS 58 (FIG. 3) strips the wireless MAC wrappers from the wireless MAC frames and re-assembles the LAN MAC frame.
13. The received LAN MAC frame is handed up to the LLC layer of the MS's protocol stack.

This case is symmetric.

The second case is more complicated and asymmetric, and is described relative to FIGS. 2 and 3. Consider first the case where an MS 40 wants to start a session with another MS 47 or a remote fixed host.

1. The source MS's 40 protocol stack produces an IEEE 802.2 LLC frame which is wrapped to make, say, an 802.3 LAN MAC frame.
2. The source MS 40 fragments the LAN MAC in the wireless link MAC layer and wraps it to make wireless MAC frames.
3. The source MS 40 transmits the wireless MAC frames on the wireless link according to its protocol.
4. The CC 55 receives the wireless signal and demodulates it to extract the wireless MAC frame.
5. The CC 55 passes the wireless MAC frames to the MTSO switch 54.
6. The MTSO switch 54 relays the wireless MAC frames to the LAN MDSC 50 (based on their class of service).
7. The MDSC's Link Manager 52 strips the wireless MAC wrappers from the wireless MAC frames and re-assembles the LAN MAC frame.
8. The MAC Relay 56 examines the MAC frame and determines that the destination MAC address is NOT in this MTSO 43 (based on directory entries).
9. The MAC Relay passes the LAN frame to the MS's Shadow PC 62.
10. The Shadow PC 62 consults its telephone directory and finds the appropriate telephone number (see below for origins of the telephone directory). The appropriate telephone number will be:
    a. the telephone number of another MS, or
    b. the telephone number of the WAB which is the gateway to the required fixed host.

In either case, the Shadow PC 62 can use the telephone number to set up a connection to either the MTSO or the WAB which hosts the destination MAC address. (In some WANS, the addressing mechanism may not be a telephone number, however, the principle still holds.)

11. First, however, the Shadow PC 62 queries the Stream Manager 64 to see if there is already a connection to the required telephone number.
12. If there is such a connection, the Shadow PC 62 can begin to pass the LAN MAC frames to the appropriate stream in the Stream Manager 64.
13. If there is no such connection, then the Shadow PC 62 can pass the appropriate call set up data to the WAN i/f 66 and establish the connection and then begin to pass the LAN MAC frames to the new stream in the Stream Manager 64.

14. The WAB 46 (FIG. 4) can now add directory information concerning the MS. As described here, the MTSO will appear as an 802.3 (Ethernet) LAN; in this case the WAB 46 creates a new "port" entry for the MTSO (if this is a new connection) and adds the MS's MAC address. The MTSO could also be made to appear like an 802.5 (Token Ring) LAN with a ring number assigned by the WAB.

15. The Stream Manager 76 can now pass wrap the LAN MAC frames for the WAN 68 and pass them to the remote MTSO or WAB.

16. At the remote MTSO or WAB, the WAN frames are unwrapped and forwarded to the MAC relay function, which uses its directory information to route the LAN MAC frames to the final destination. The WAB may also perform Source Routing/Transparent bridge transformations of the LAN MAC frames.

17. The WAB 68 can perform a filter function to exclude access from unauthorized MSs. It can rely on the MTSO/MDSC to have authenticated the MS.

Once the connection between the MTSO and the remote MTSO or the WAB has been established, the remote MS or the remote fixed host can also respond to the originating MS.

When the MDSC needs to establish a connection to a WAB which is the gateway to a particular MAC address, it needs a telephone number (or its equivalent for the particular WAN). In principle one could imagine a global White Pages service, which the MDSC could consult in order to find this number. However this poses several problems:

1. Size: There are today some 100 million PCs worldwide and the number continues to grow. A major effort is required to assemble the data for such a directory. A global directory also requires more computation to search.

2. Security: Such a directory would be an open invitation to hackers. It seems unlikely that establishments would want to have their WAB access numbers listed in a global directory.

Another possibility is to associate each MS with one or more specific White Pages directories at the time it is authorized to access the cellular network. Each enterprise could be provided a means to maintain its own directory. When an MDSC needs to make a connection on behalf of an MS, it could search in the directories for which that MS is authorized. Although this seems more manageable, it still retains to a lesser degree the problems of the global White Pages service.

A third possibility is that each MS carries with it the specific set of WAB telephone numbers for which it has been authorized by the establishment(s) and the associated MAC addresses of fixed hosts. This directory is transmitted by the MS to its the MDSC Shadow PC during the registration process and is part of the state information transferred between MTSOs during a handoff. The MS must also be able to update the cached directory in the MDSC. This puts control of the problem with the MS and security is addressed by encrypting the data during transmission to the Shadow PC (the Shadow PC is a trusted host).

When an MTSO needs to establish a connection with an MS in another MTSO, it needs help from the cellular network. An exactly similar situation applies when a WAB needs to make contact with an MS whose location is unknown. In either case, the MTSO or the WAB calls the MS's data telephone number in the PSTN. The cellular system's roaming manager will locate the MTSO owning the required MS and complete the call. When the call completes to the MTSO owning the MS, the MTSO will recognize that this is a telephone number for a data service to be connected through a WAN (possibly including the PSTN). The MTSO will answer the call on behalf of the MS and send back its telephone or other access numbers for the one or more WANs to which it is connected. The WAB captures this information, selects a WAN to which it also is connected and establishes a connection to the MTSO's LAN MDSC.

Network Management

Refer to FIGS. 2-4. An MS connected from a wide-area LAN to one or more establishment LANs is a member of each of these LANs. The pseudo-LAN 74 functions in each WAB 46 report to the establishment LAN manager on behalf of all the MSs in each connected wide-area LAN (or MTSO). Note that an MS is capable of establishing connections to multiple WABs and thereby become a member of multiple establishment LANs. It can therefore be known to multiple network managers, which may be confusing, if there is a separate integration of establishment LANs by backbone data networks. The same MS could appear in more than one part of the enterprise's networks!

Mobility

There are several cases of mobility to be considered:

1. An MS 40 communicates with another MS 47 in the same MTSO 43 and moves among cells covered by the same MTSO 43.

2. An MS 40 communicates with another MS 47 in the same MTSO and moves to a cell covered by a different MTSO (not shown).

3. An MS 40 communicates with an establishment LAN 48 and moves to a cell covered by a different MTSO.

4. An MS moves between an establishment environment, where it has local wireless access to the LAN, and a remote environment, where it has wide-area wireless access.

With the possible exception of the last case, the invention supports non-disruptive mobility of the MS, subject only to potential watchdog timeouts if the handoff process is too lengthy. The timeout problem is avoided if the Shadow PCs provide the Suspend/Resume function. Non-disruptive mobility means that the remote, non-moving system need not be aware of the MS's movement, in particular, it does not require any changes in the MS's address. This is because the MS never communicates directly with any other system; it always communicates via some intermediary such as the MDSC and the WAB. These entities can conspire to conceal the MS's movement from the non-moving systems. The last case, as noted above, may be an exception to this principle (see below).

In case 1, the only actions required are clean handoff by the MTSO of the MS from one CC to the next and an update of the MDSC directory information, so that the MAC Relay can correctly address the packets for the MTSO switch. In case 2, the new MTSO should actively contact the previous MTSO and notify it of the new ownership. The previous MTSO should then do the following:

1. establish a connection through the WAN between the two MDSCs, 2. migrate the Shadow PC state information, 3. update the directory information in both MDSCS, 4. begin to relay frames between the two MTSOS.

Even for voice service, the MTSO is likely to be able to predict an impending handoff and can thus begin these processes before the MS leaves the previous MTSO. In the worst case, the previous MTSO has to invoke the roaming manager to determine where the MS has moved. Neither MS is aware of the change in "LAN" configuration.

In case 3, the MS is already communicating via the WAN. Changing the MTSO implies that the WAB needs to change its connection through the WAN to the new MTSO and the MTSOs need to hand off the communication as in case 2. The WAN change could be initiated either by one of the MTSOs setting up the connection through the WAN to the WAB, or by the WAB being notified of the change by the previous MTSO. Again, neither MS is aware of the change in "LAN" configuration.

In case 4, the MS is envisaged to have a wireless modem capable of operation both as a cellular (outdoor) modem and as a wireless LAN access (indoor) modem. The modem has a common MAC address for these modes and a common device driver. For the purpose of this discussion, the cellular telephone coverage is assumed to overlap with the wireless LAN coverage. Thus as the MS moves from the "outdoor" environment to the "indoor" environment, communication will continue and there will come a point where the wireless LAN access modem can register with the indoor cell. The MS then becomes owned by a wireless LAN access base station and is visible through the base station's bridge function to other members of the establishment LAN. If the MS cellular modem now informs the MTSO that it is dropping the wide-area connection, the MDSC can inform the WAB. WAB can then re-direct any queued messages to the base station, and drop the MS from its directory. The MDSC can begin to write-back any cached information in the User Context to the appropriate hosts (if any). The MDSC can also inform the WAB of all sessions established by the MS; the WAB can then use this information to re-establish all sessions outside its own establishment LAN.

The MS has now crossed a boundary between the cellular network and the establishment LAN. Communication with systems on the establishment LAN can now take place "directly", provided that the wireless LAN access system support non-disruptive handoff (in this case between the WAB and the base station). Non-disruptive handoff in wireless LAN access systems is the subject of a related disclosure; watch this space. Communication with systems on other establishment LANs, with MSs in the same MTSO and in other MTSOs will all have to be re-established through the WAB.

For an MS which moves from the indoor to the outdoor environment, this entire process will have to be reversed.

Mobile Station

The MS can be any form of mobile or remote data system, including portable computers, facsimile machines, telemetry systems and so forth. The MS contains or is connected to a modem capable of executing the wireless protocol and the MS has a device driver which provides the interface between the modem and the various data services the MS may require, including LAN protocol stacks. The modem is probably a slight variant of the modem used for a mobile telephone. The modem may also provide a telephone handset for speech service.

Cell Controller and MTSO

These do not form part of this invention, except to the following extent:

1. The MTSO switch must be modified to recognize the multiple data service classes.

2. The MTSO switch must provide one or more ports for each of the data service classes.

3. The MTSO must provide appropriate per packet billing services for the data service classes.

4. The MTSO must perform certain actions when it receives a call through the PSTN to the data telephone number of a MS.

MDSC

The MDSC is a set of functions attached on one side to a port of the MTSO switch and on the other side to one or more WANS. A separate MDSC must be provided for each class of data service. The MDSC could be an integral part of the MTSO itself, since this is in effect a computer, or it could be a separate general purpose computer. All the MDSC functions, apart from the connections to the MTSO switch and the WANs, are software functions.

WAB

The WAB is a set of functions attached on one side to the establishment LAN and on the other side to one or more WANs and the PSTN. The WAB is a general purpose computer, possibly dedicated to this application. All the WAB functions, apart from the connections to the establishment LAN and the WANs and the PSTN, are software functions.

Method of Operation

To further illustrate the invention, a detailed description of the operation of its several components is set forth. This description is supported by FIGS. 5-21. These FIGS. show the functions implementing the invention as discrete modules; these modules may be executed on one or more computers in the MDSC 42 (FIG. 3) and WAB 46 (FIG. 4).

Mobile Data Service Controller Operation

Figure 5:
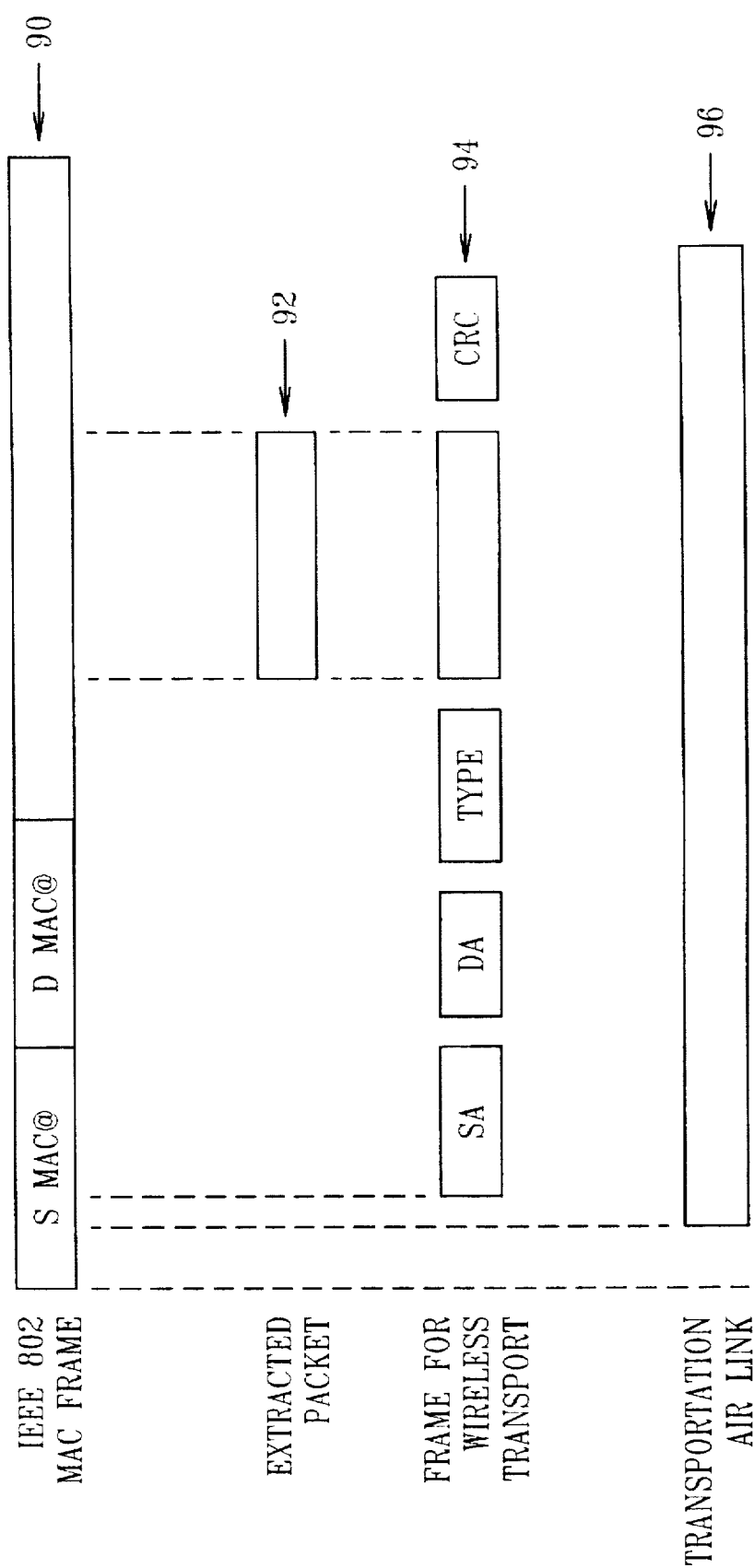
FIG. 5 is a diagram of a wireless MAC frame.

FIG. 5 shows that the network adaptor device driver in the MS 40 can prepare a IEEE 802 MAC Frame 90 just as if it were to be transmitted via an Ethernet or a Token-ring. Since error rates on wireless links are in general much higher than on wired LANs, it is preferable to sub-divide this frame into smaller Extracted Packets 92, thereby reducing the probability of error in the transmission of a given Wireless MAC Frame 96. The MAC Frame 90 is subdivided into small fragments of, say 400 Bytes, and each of these is framed as a Wireless MAC Frame 94 by adding short source (SA) and destination (DA) identifiers for the MS 40 (FIG. 2) and CC 2 (FIG. 1) respectively. Also included are a TYPE field that specifies the type of service required by this frame, a COUNT field indicating the number of fragments to be transmitted and the position of this fragment in the sequence, and a CRC (Cyclic Redundancy Check) field for error detection; more sophisticated Forward Error Correction schemes are also possible. The resulting Wireless MAC Frame 96 can then be transmitted via the wireless link 60 (FIG. 3) from the MS 40 to the CC 2. The original MAC Frame 90 will be entirely transmitted in this way before a new MAC Frame 90 is begun. An exactly equivalent process is used for transmission from the CC 40 to the MS 2.

Figure 6:
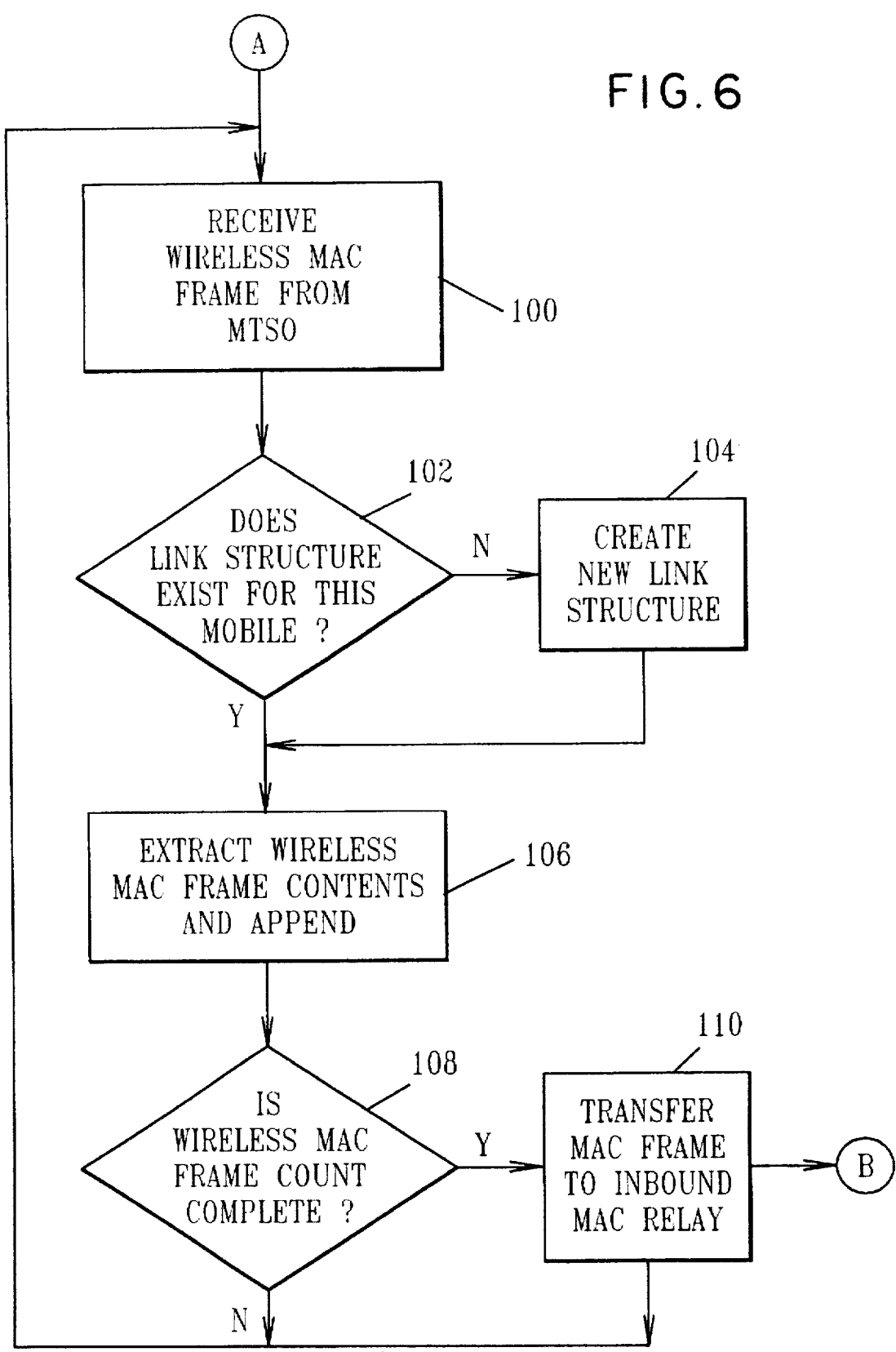
FIG. 6 is a flow chart of a MDSC inbound link manager which is shown generally in FIG. 3.

FIG. 6 shows the processing of an Inbound Wireless MAC Frame 96 by the Inbound Link Manager 52 of the MDSC 42 (FIG. 3). (Note that in the remainder of this description "Inbound" is used to denote transmission along a path starting at a MS 40 in the direction of a Remote System (RS) 50 typically connected to a remote WAB 46. Similarly "Outbound" denotes transmission along a path beginning with a RS 50 connected to a WAB 46 in the direction of a MS 40. These are general indications of flow and exceptions will be identified in the description.) At this stage the Wireless MAC Frame 96 has been received by the CC 2 identified in its DA and routed by the MTSO Switch 54 to the MDSC 42 according to the TYPE field. At block 100 the Wireless MAC Frame is received at the MDSC Inbound Link Manager 52. At decision block 102 the Link Manager 52 checks whether is has already begun a Link Structure for this MS 40. At block 104 a new link Structure is created if none existed.

At block 106 the wrapper added to the Extracted Fragment 92 of the MAC Frame 90 is removed and the Extracted Fragment 92 is appended to the Link Structure. At decision block 108 the Wireless MAC Frame count is examined to determine whether the complete MAC Frame 90 has been transmitted. If the count is complete, then the Link Structure is now the complete MAC Frame 90 and can be handed off to the Inbound MAC Relay 56 at block 110. Otherwise the Link Manager 52 waits for additional Wireless MAC Frames 96 to complete the Link Structure by returning to block 100. This process reverses the fragmentation produced at the MS 40 and shown in FIG. 5 and re-creates an IEEE 802 MAC frame suitable for transmission directly on a LAN.

Figure 7:
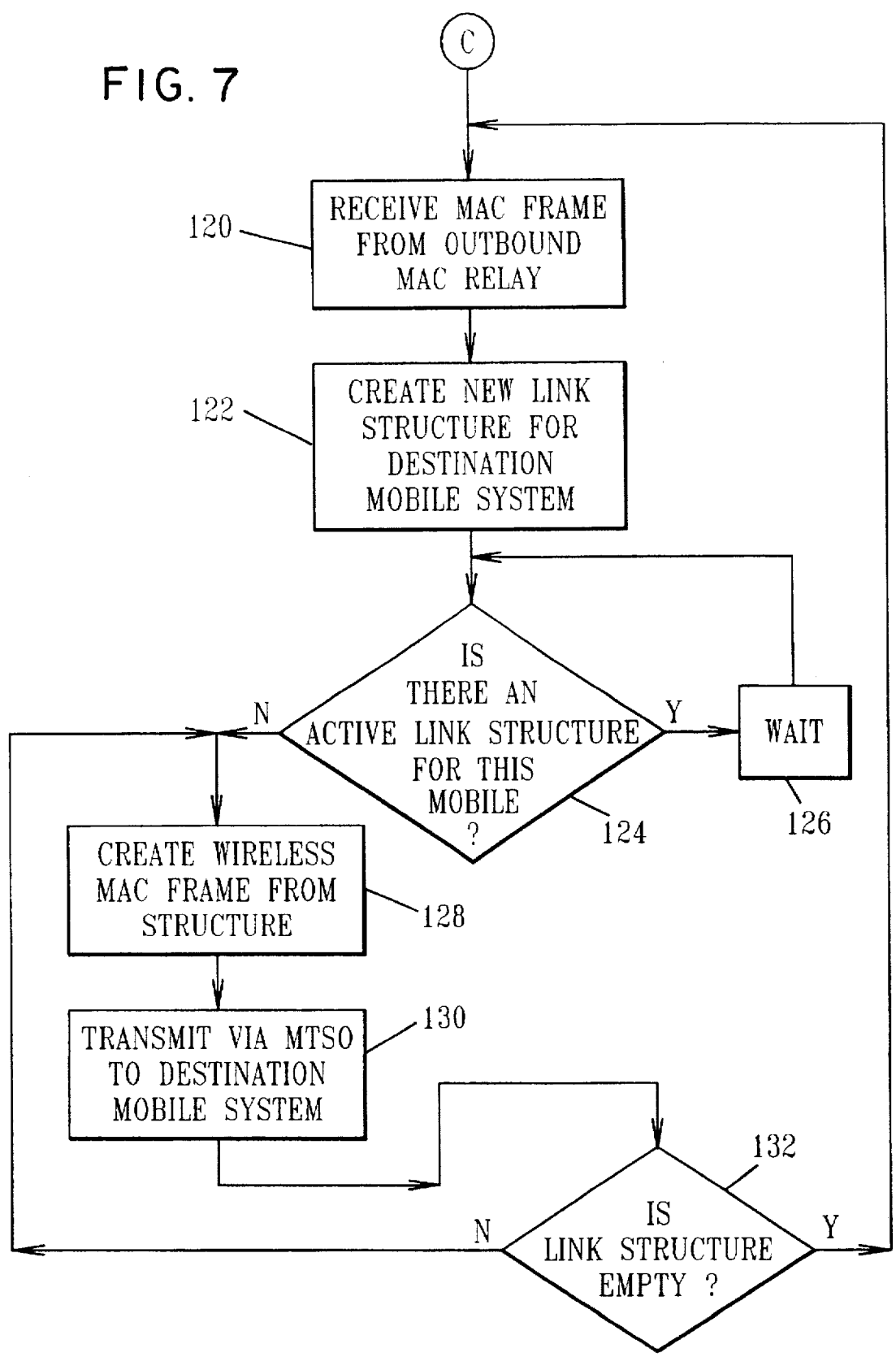
FIG. 7 is a flow chart of a MDSC outbound link manager which is shown generally in FIG. 3.
Figure 9:
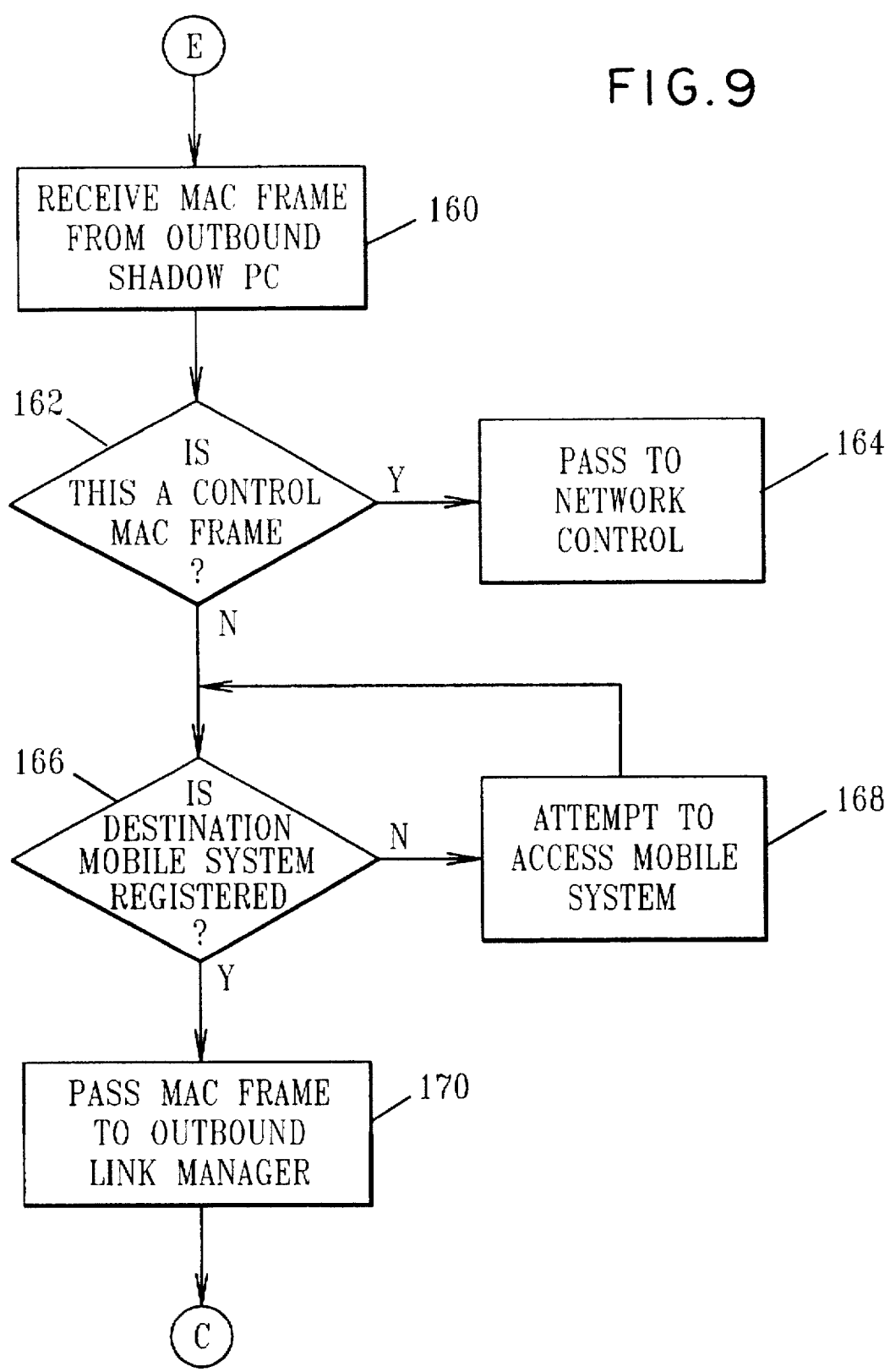
FIG. 9 is a flow chart of a MDSC outbound MAC relay which is shown generally in FIG. 3.

FIG. 7 shows the outbound version of FIG. 6, where the process is essentially reversed for outbound wireless transmission to the MS 40. Note that the Link Structures are transmitted serially to the MS 40. If a new Link Structure is received while a previous Link Structure is still active, the Outbound Link Manager will wait until the transmission of the previous Link Structure is completed. The MAC frame is received at block 120 from the outbound MAC relay (FIG. 9). A new link structure is then created at block 122 for the destination mobile system. A determination is then made at decision block 124 as to whether or not there is an active link structure for this particular mobile station. If there is, the system enters a wait state for a predetermined time interval at block 126. If there is not a link structure, one is created at block 128. The wireless MAC frame is then transmitted at block 130 via the MTSO to the destination mobile station. A determination is then made at decision block 132 as to whether or not the link structure is empty. If it is not empty, a return is made to block 128. If it is empty, a return is made to block 120.

Figure 8:
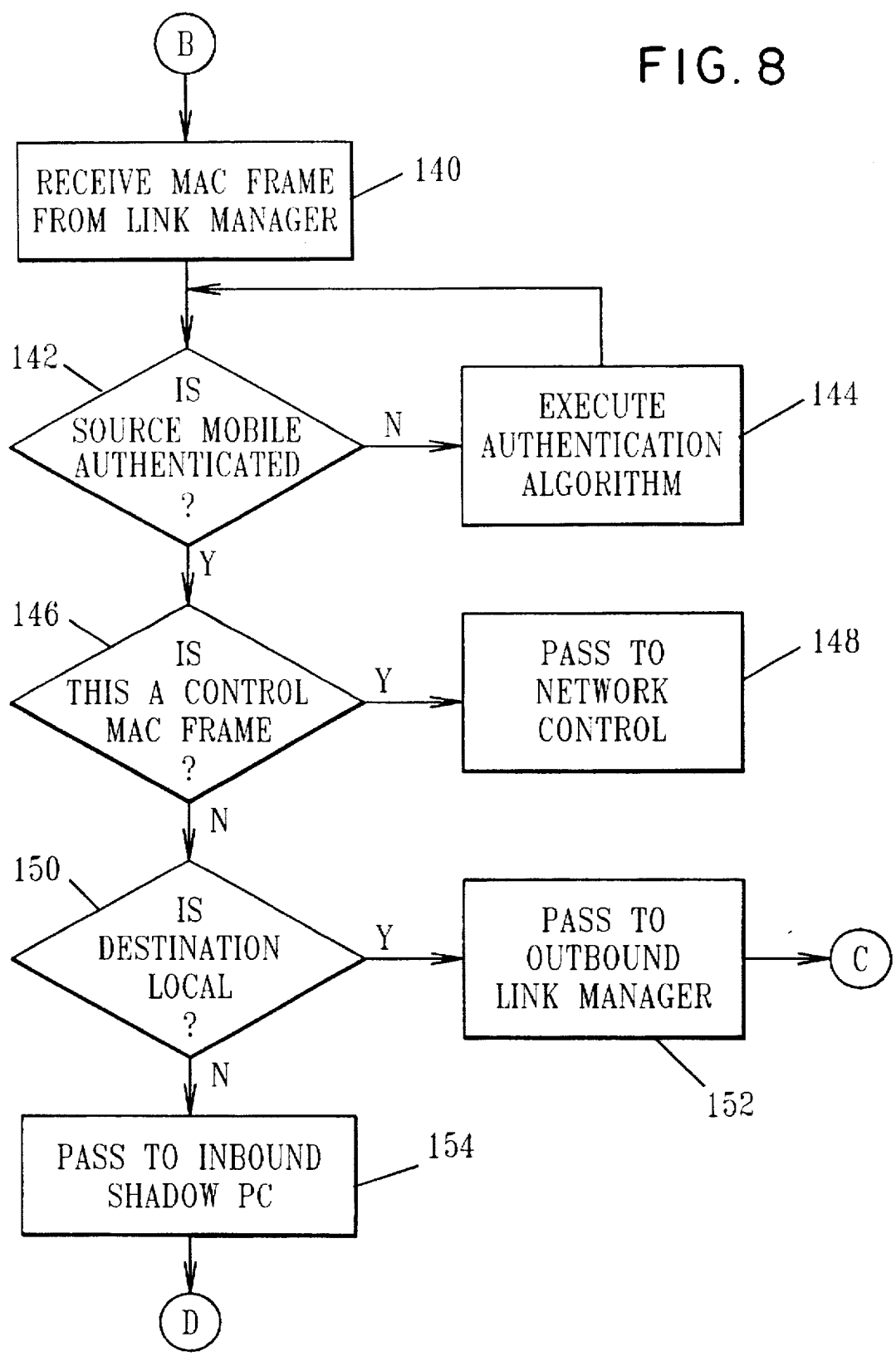
FIG. 8 is a flow chart of a MDSC inbound MAC relay which is shown generally in FIG. 3.

FIG. 8 shows the processing of the MAC Frame 90 by the MDSC Inbound MAC Relay 56. At block 140 the MAC Frame 90 is received from the Inbound Link Manager 52. At decision block 142 the MAC Relay 56 consults its Network Management 53 tables to determine whether the MS 40 identified by the MAC Frame 90 source address (SA) has been authenticated. If not, the Inbound MAC Relay executes an authentication algorithm at block 144 and returns to block 142. The security of this system can be made arbitrarily high by encrypting the MAC Frame for transmission or by other well-known means. Likewise compress/de-compression of MAC Frames 90 can be readily incorporated in the MAC Relay 56.

Next the Inbound MAC Relay 56 examines the MAC Frame 90 header at decision block 146 to determine whether it is a control frame; if so, it is passed to the Network Control 53 at block 148. This mechanism allows the MS 40 to pass information to the MDSC 42, such as routes, which are needed for the operation of the invention. At decision block 150, the Inbound MAC Relay searches for the MAC Frame 90 destination address in its Network Management 53 table of local MSs 40. If there is a match, then the MAC Frame 40 can be simply re-directed to the MDSC Outbound Link Manager at block 152 for transmission to the destination MS 40. This function, which is a key feature of the invention, permits the MDSC to create virtual LANs among MSs 40 operating within the cells controlled by a single MTSO. The MSs 40 can perform network computing using LAN protocols just as if they were joined by wired LANs. If the destination is not a local MS 40, then the MAC Frame 90 is passed at block 154 to the MDSC Inbound Shadow PC 62.

The MDSC Outbound MAC Relay 56 performs a similar set of functions as shown in FIG. 9. Here the MAC Frame 90 is received at block 160 from the MDSC Outbound Shadow PC 62. Again the MAC Relay 56 checks whether it is a control frame at decision block 162. If it is a control frame, it is then passed to network control at block 164. At decision block 166 it verifies that the destination MS 40 is actually registered with its Network Management 53 tables. There are a number of reasons why a frame might be received for a MS 40 which is not registered:

The destination MS 40 is in one of the cells 2, 4, 6, 8 supported by this MDSC 42, but it has been idle for some time and the MAC Relay 56 has de-registered it.

The destination MS 40 was in one of the cells 2, 4, 6, 8, but has recently moved to a cell supported by another MDSC 42. The present MDSC 42 may be aware of this because the destination MS 40 or the new MDSC 42 have notified it of the change or because it has previously attempted to access the destination MS 40 and failed. When the MDSC 42 becomes aware that the destination MS 40 has moved to a new MDSC 42, it will notify the remote WAB 46. However, since the process may not be atomic, it may happen that the remote WAB still attempts to access the destination MS 40 at the old MDSC 42.

The destination MS 40 is no longer known to be accessible via any MDSC 42. It may have been powered off or have moved out of the coverage areas of the cellular system.

If the destination MS 40 is not registered and the present MDSC 42 does not know of a new MDSC 42 for it, the present MDSC 42 will attempt to access the MS 40 at block 168; this may fail, in which case the MDSC will return a fail message to the source WAB (not shown here). If the destination MS 40 is not registered and the present MDSC 42 does know of a new MDSC 42 for it, the present MDSC 42 will return the MAC Frame 92 to the source WAB together with the network address of the new MDSC 42 (not shown here). If the destination MS 40 is registered, the MAC Relay 56 passes the MAC Frame 90 to the MDSC Outbound Link Manager 52 at block 170.

Figure 10:
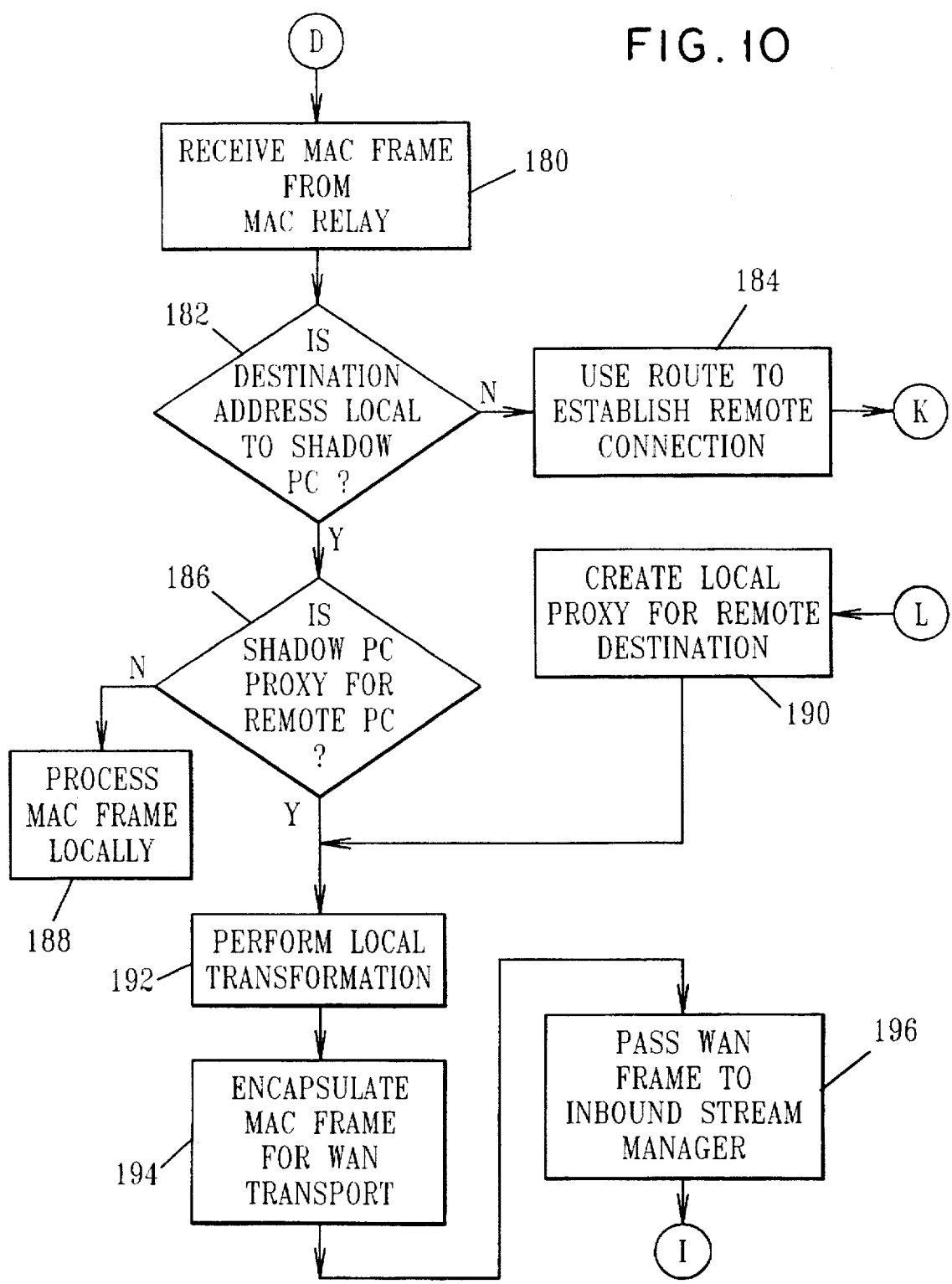
FIG. 10 is a flow chart of a MDSC inbound shadow PC which is shown generally in FIG. 3.

FIG. 10 shows some the functions which may be performed by the MDSC Inbound Shadow PC 62. At block 180 the MAC Frame is received from the MDSC Inbound MAC Relay 56. At decision block 182 the Shadow PC 62 examines the MAC Frame 90 destination address to determine the address corresponds to an existing Shadow PC 62. If not, then at block 184 the Shadow PC 62 makes a request to the MDSC Outbound Stream Manager 64 to establish a connection to the destination address (see FIG. 14).

If the destination address of the MAC Frame 90 is a local Shadow PC 62 address, then at decision block 186 the Inbound Shadow PC 62 checks to see if this address is for a proxy for a remote PC or other computer system. This is another key feature of the invention, in which the local Shadow PC 62 can act as a proxy for a RC 50 and the local MS 40. This function can support many features which are useful for mobile computing, for example:

The Shadow PC 62 acts as a proxy for the MS 40, so that if the MS 40 is temporarily disconnected due to loss of the wireless link, the RC 50 will continue to receive basic networking responses and thus maintain the connection.

The Shadow PC 62 acts as a virtual terminal for a conversation-based application on the RC 50 and reduces the data to be transmitted on the wireless link by extracting only the contents of the screen fields.

The Shadow PC 62 acts as a virtual terminal or a virtual client for conversation or RPC-based applications on the RC 50 and provides a message-based protocol to the MS 40, which is advantageous for mobile computing.

The Shadow PC 62 performs transformations between different screen formats of the RC 50 and the MC 40. (The MC 40 may have a very limited display capability, or in some cases none at all and the Shadow PC 62 must perform conversion to, say, voice output.)

Alternatively, if the Shadow PC 62 is not a proxy for a RC 50, then it must be a local application, and the MAC frame is processed locally at block 188. This illustrates another key feature of the invention, in which the MDSC 42 enables the MS 40 to perform client-server computing with applications supported in the MDSC 42. These applications can be made robust for the purposes of mobile computing and can be made generally available at all MDSCs 42 in the cellular telephone system. This further enables the MS 40 to access the same application throughout the cellular system and to migrate its usage among various MDSCs 42. At block 190, the MDSC Outbound Stream Manager 64 successfully returns from establishing the connection to the RC 50 and the Shadow PC 62 creates a new proxy for the RC 50.

At block 192, if the MAC Frame 90 destination address is in fact for a RC 50, the Inbound Shadow PC 62 prepares to transmit it on the WAN 44. These local transformations may include any of the functions listed above where the Shadow PC 62 acts as a proxy for the MC 40 and RC 50.

The final processing step at block 194 in the Shadow PC 62 is to prepare the MAC Frame 90 for transport on the designated Wide-Area Network 44. The Shadow PC 62 can determine from the destination address and the Network Management 53 tables the nature of the particular WAN 44 that will transport a given MAC Frame 90 and perform encapsulation of the MAC Frame 90 with the appropriate header and tail. The resulting WAN Frame is then passed to the Inbound Stream Manager 64 at block 196 for transmission on the WAN 44.

Figure 11:
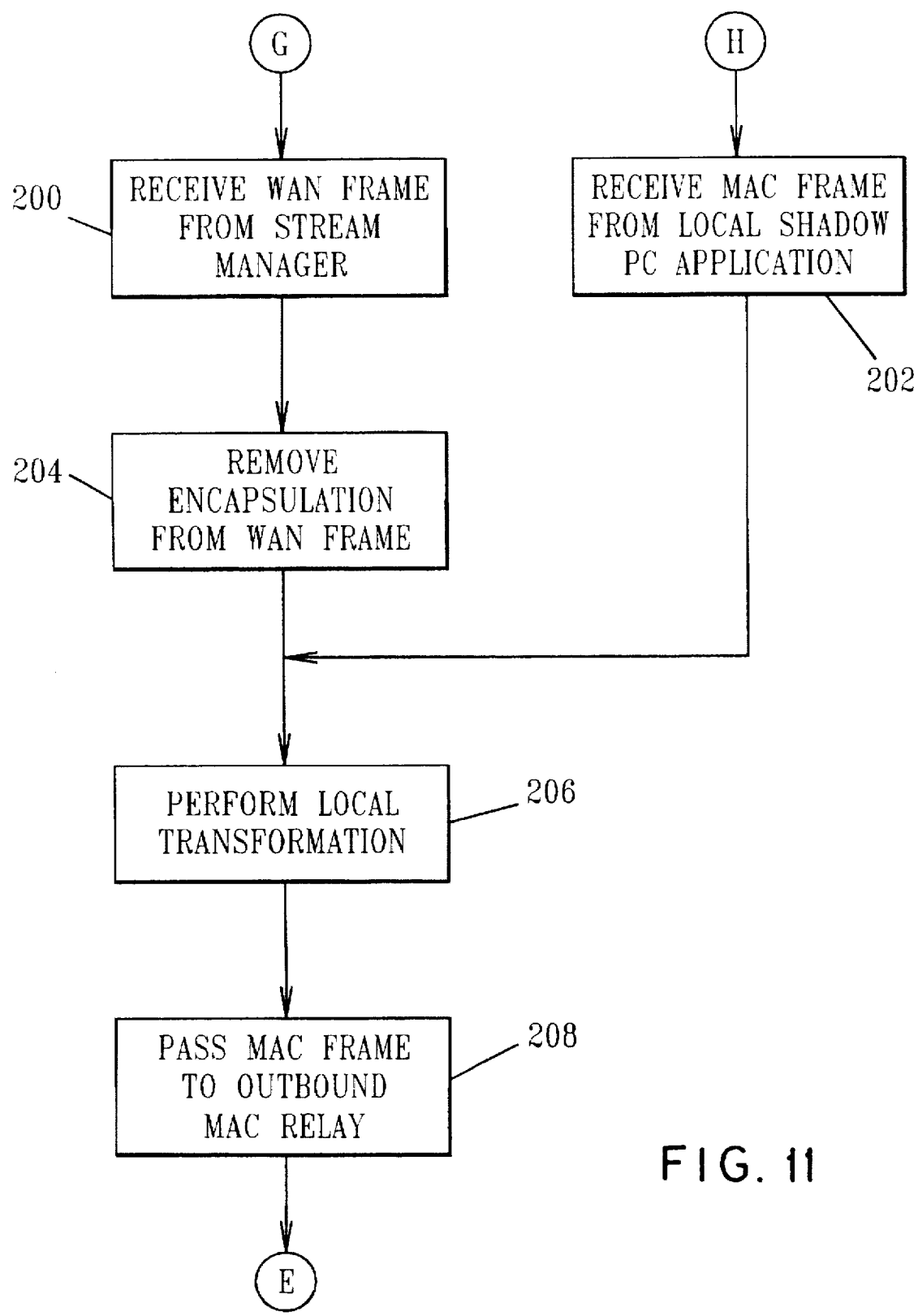
FIG. 11 is a flow chart of a MDSC outbound shadow PC which is shown generally in FIG. 3.

FIG. 11 shows the MDSC Outbound Shadow PC 62 functions, which complement those of the MDSC Inbound Shadow PC 62. MAC Frames 90 can be received by the Outbound Shadow PC 62 via either of two paths:

1. At block 200, from the a RC 50 via the Outbound Stream Manager 64, or
2. at block 202, from a local application at block 188 (FIG. 10).

MAC Frames 90 arriving from the Stream Manager 64 are encapsulated as WAN Frames and the encapsulation must be removed at block 204 in the reverse of operation block 194 (see FIG. 9). At block 206 the Outbound Shadow PC 62 may perform local transformations just as in the Inbound Shadow PC 62 case at block 192. The transformed MAC Frames 90 are then passed to the MDSC Outbound MAC Relay at block 208.

Figure 12:
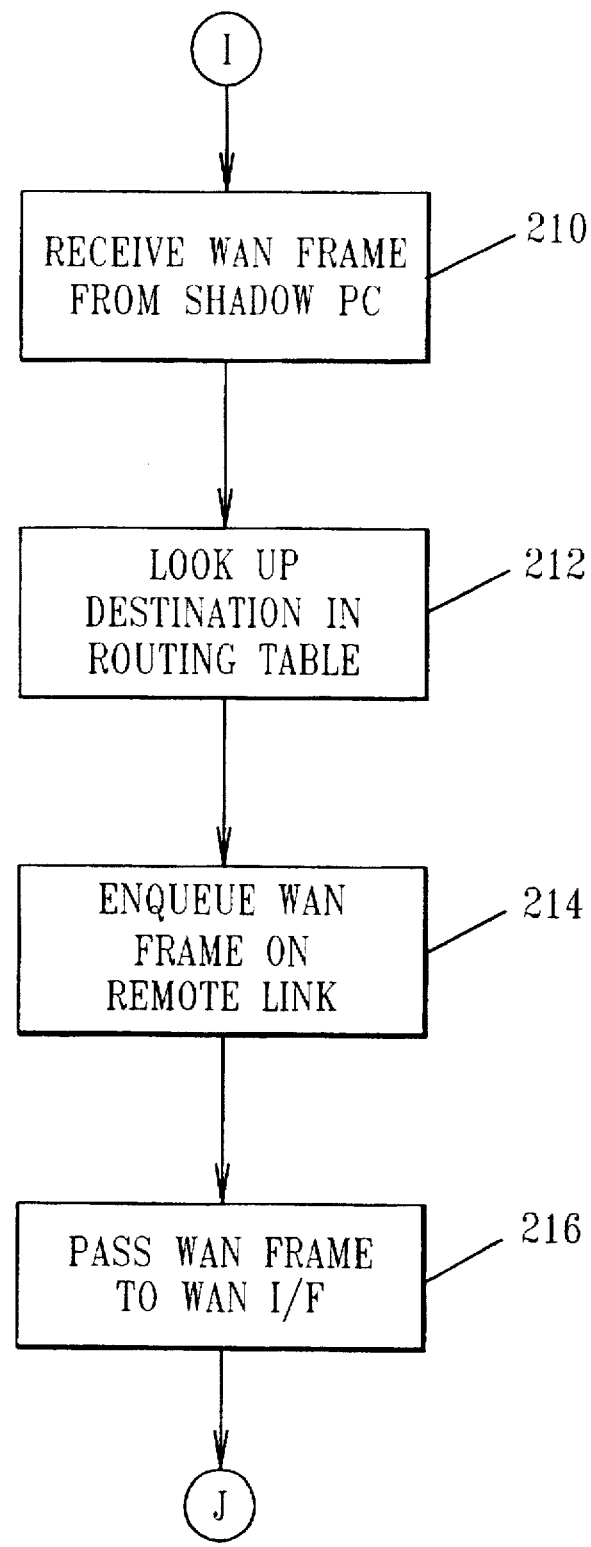
FIG. 12 is a flow chart of a MDSC inbound stream manager which is shown generally in FIG. 3.

FIG. 12 shows the reception at block 210 of WAN Frames at the MDSC Inbound Stream Manager 64, with the destination being looked up in routing tables at block 212. The in-line function, at block 214, of the Stream Manager 64 is to enqueue inbound WAN Frames on the appropriate stream for transmission via a WAN 44. When the WAN Frame reaches the head of the stream queue it is transferred out to the WAN interface 66 at block 216.

The MDSC Stream Manager 64 also has important management functions. It is responsible for establishing the remote connections (see FIG. 14 and description below). It is also responsible for managing the stream queue lengths so as to maintain an upper bound on the end-to-end transmission latency between the MS 40 and RC 50; this is important as many LAN protocol incorporate timers for the detection of error conditions. If the Stream Manager 64 detects that a given stream queue is too long, it may:

1. Request additional bandwidth from the WAN 44, or
2. establish an additional connection in parallel with the existing connection via the same WAN 44 or a WAN with higher bandwidth.

Figure 13:
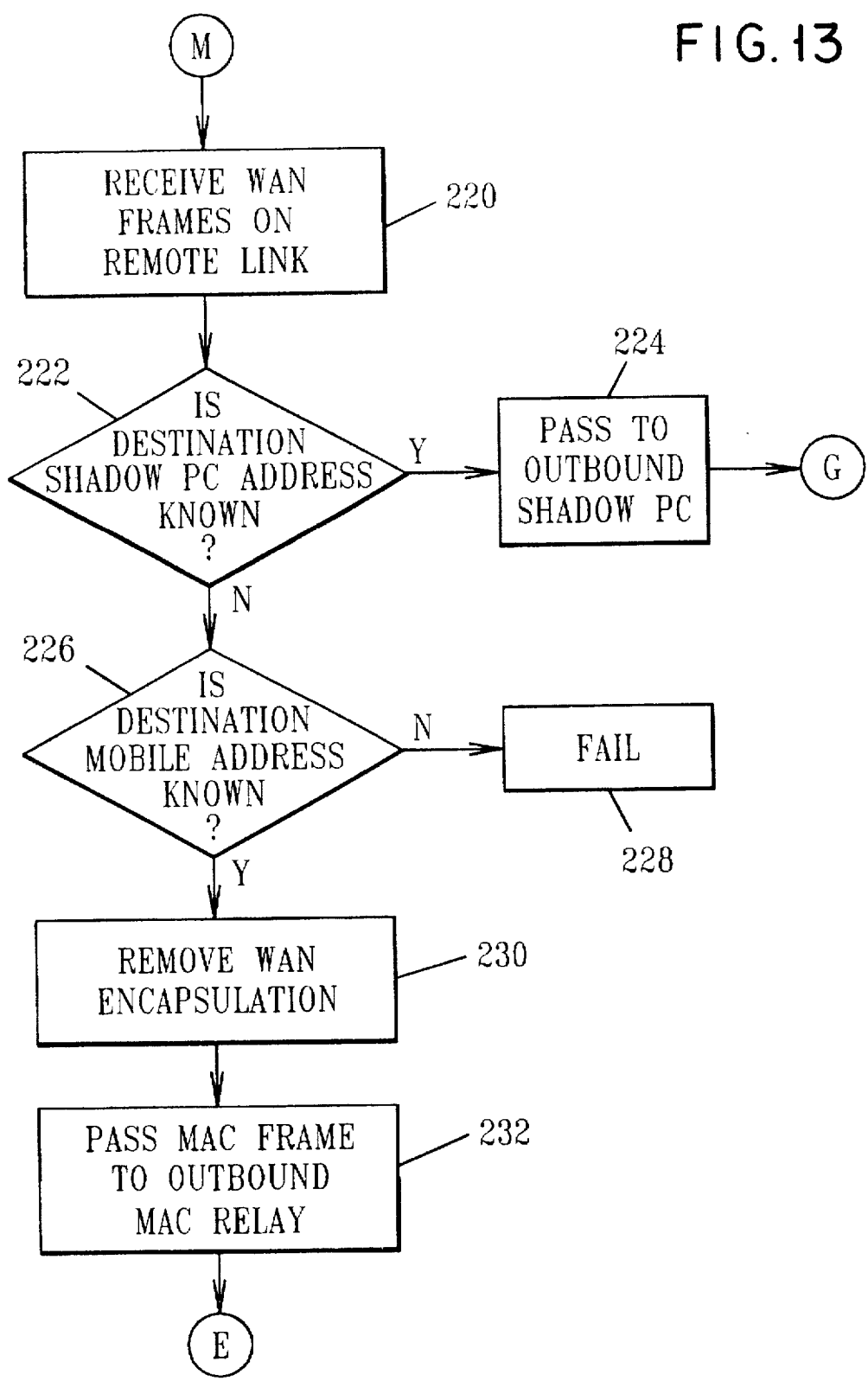
FIG. 13 is a flow chart of a MDSC outbound stream manager which is shown generally in FIG. 3.

FIG. 13 shows the operation of the corresponding MDSC Outbound Stream Manager 64. Here WAN Frames are received from the WAN interface 66 at block 220. The Stream Manager 64 may inspect the destination MAC address and determine at decision blocks 222 and 226 whether the encapsulated MAC Frame is addressed to:

1. A Shadow PC 62, or
2. directly to a local MS 40.

If the destination address is not found in either of these groups, the Stream Manager 64 sends a fail message to the remote WAB 46 at block 228. Otherwise the WAN frame is passed to the Outbound Shadow PC 62 at block 224, or the encapsulation is removed at block 230 and the MAC frame is passed directly to the local MS 40 at block 232.

Figure 14:
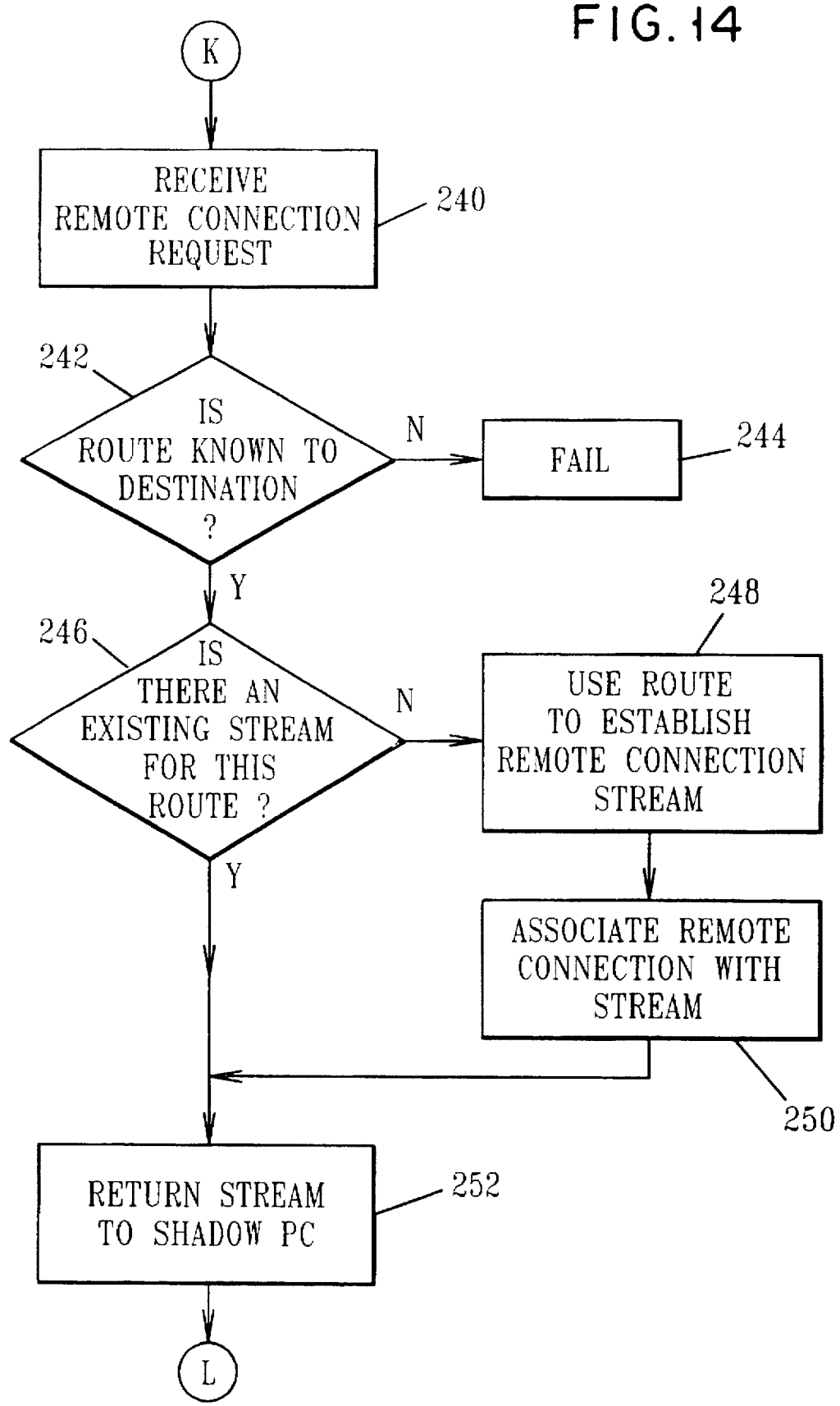
FIG. 14 is a flow chart of how to establish a connection to a remote WAB via a MDSC outbound stream manager.

FIG. 14 shows the functions in the Stream Manager 64 which perform the establishment of connections to the remote WAB 46. At block 240 the Stream Manager 64 receives a request from the Shadow PC 62 to establish a connection to the destination address of a MAC Frame 90 received by the Shadow PC 62. The Stream Manager searches the Network Management 53 tables for a route to the destination address. This route might be a well-known or public route or might have been provided earlier (steps 148 or 162) by the MS 40 or RS 50 respectively. If no route to the destination address is found at decision block 242, the Stream Manager 64 sends a fail message to the Shadow PC 62 at block 244. If a route is found at decision block 242 the Stream Manager 64 then checks at decision block 246 to determine whether there is an existing stream for that route. If there is no existing stream, the Stream Manager uses the route information provided to establish a connection at block 248 to the remote WAB 46 and associates this route with a new stream at block 250. At this point the stream is ready to accept WAN Frames for the destination and control is returned to the Shadow PC 62 at block 252.

Wide-Area Bridge Operation

Figure 15:
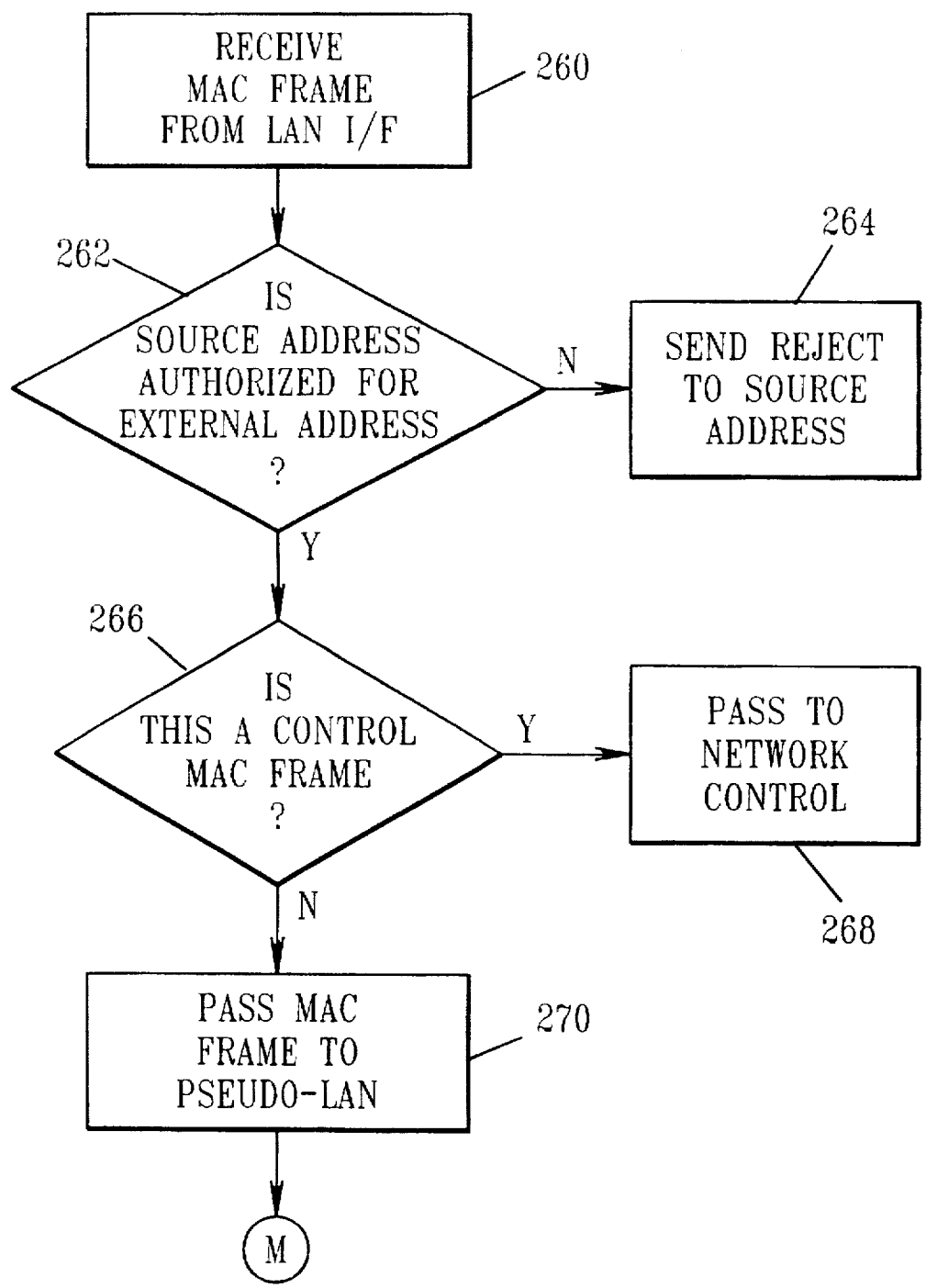
FIG. 15 is a flow chart of a WAB outbound MAC relay which is shown generally in FIG. 4.

FIG. 15 shows the WAB Outbound MAC Relay 72 at the WAB 46 (FIG. 4). At block 260 the MAC Relay 72 receives a MAC Frame 90 from the LAN interface 70. The LAN interface is responsible for examining MAC Frames 90 on the enterprise LAN for matches to remote MAC address known to the WAB 46, just as in a conventional bridge. The WAB Network Management 71 tables in the WAB 46 contain entries for all remote network nodes for which connections are currently established. The MAC Relay checks at decision block 262 to determine if the source RC 50 is authorized to send frames into the (public) WAN 80 and sends a rejection at block 264 if the RC 50 is not so authorized. The MAC Relay then checks at decision block 266 to determine whether the MAC Frame is a control frame and if so, passes it at block 268 to Network Control 71. By this mechanism a RC 50 can enter or update routing information for MSs 40 it wants to access. If the MAC Frame is not a control frame, it is passed at block 270 to the WAB Pseudo-LAN 74.

Figure 16:
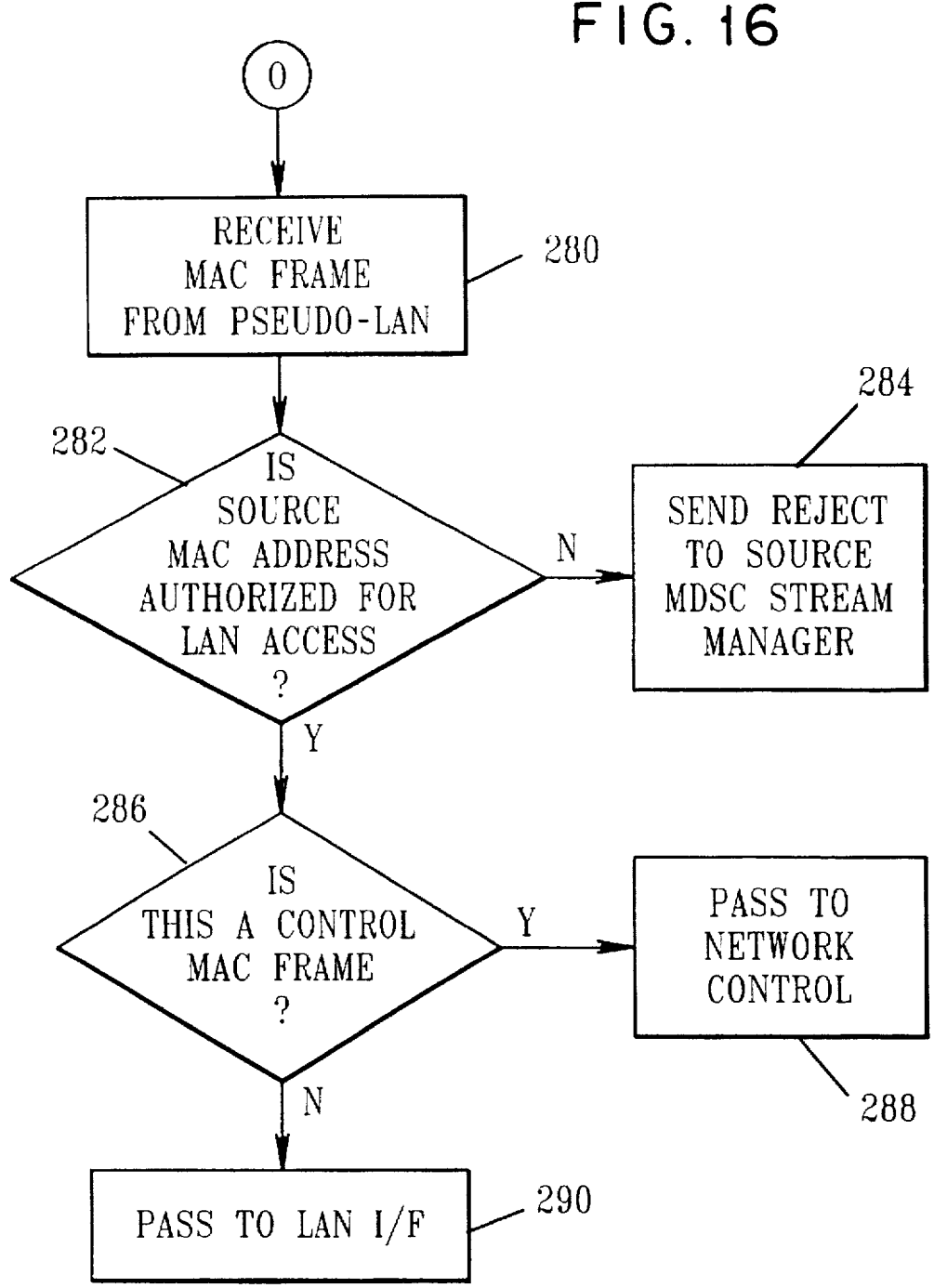
FIG. 16 is a flow chart of a WAB inbound MAC relay which is shown generally in FIG. 4.

FIG. 16 shows the WAB Inbound MAC Relay 72. Here MAC Frames 90 are received from the Pseudo-LAN 74 at block 280 and are checked at decision block 282 to determine if the source MS 40 is authorized to access the enterprise LAN. If the MS 40 is not so authorized, the MAC Relay 72 sends a rejection to the remote MDSC Stream Manager 64 at block 284. If the MS 40 is so authorized, the MAC Relay checks at decision block 286 to determine if this is a control frame. If so, the MAC Frame 90 is passed to Network Control 71 at block 288. If not, the MAC Frame 90 is passed to block 290 to the LAN interface for delivery to the destination address.

The WAB Pseudo-LAN 74 is the counterpart in some ways of the MDSC Shadow PC, in that it can act as a proxy to the RCs 50 on behalf of the LAN nodes at the MDSC. The ability to create a virtual LAN at the MDSC is a key element of this invention. The Pseudo-LAN however takes no part in supporting applications, since these will run either on the RCs 50 or in the Shadow PCs 62 at the MDSC.

Figure 17:
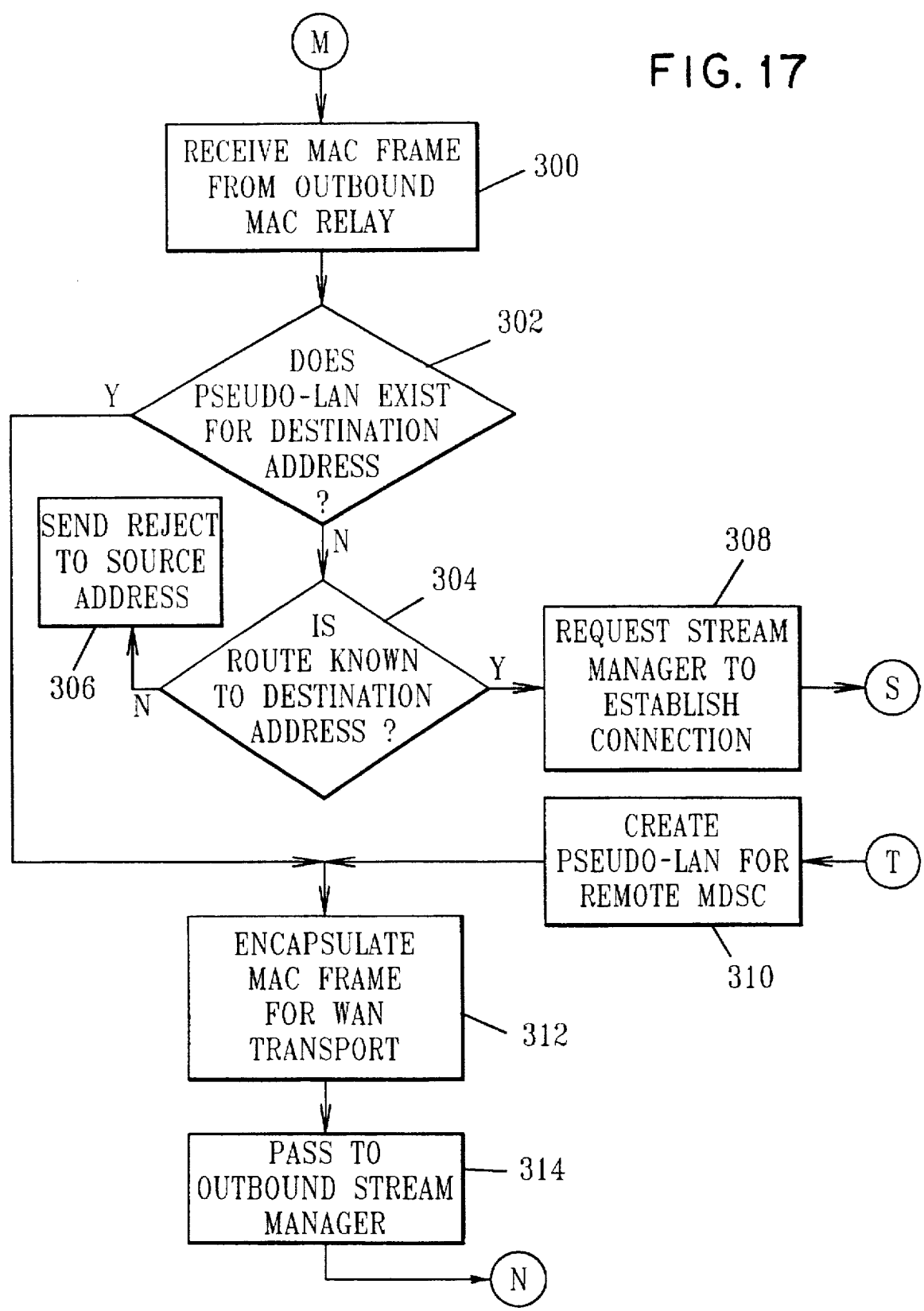
FIG. 17 is a flow chart of a WAB outbound pseudo-LAN which is shown generally in FIG. 4.

FIG. 17 shows the WAB Outbound Pseudo-LAN 74. This receives MAC Frames 90 from the WAB Outbound MAC Relay 72 at block 300. The MAC Frame 90 destination address is examined at decision block 302 to determine whether a Pseudo-LAN already exists for the destination; that is does this WAB 46 already have connections to MSs 40 at the same MDSC 42? If there is no existing Pseudo-LAN 74 the Network Management 71 tables are checked at decision block 304 to determine if a route is known to the destination address. If no route is known, the Pseudo-LAN 74 sends a rejection to the source address at block 306. If a route is known, the Pseudo-LAN 74 sends a request to the WAB Stream Manager 76 at block 308 to establish a connection to the destination MS 40. Then, if either the Pseudo-LAN 74 already exists as determined at decision block 302, or when the Stream Manager 76 successfully establishes the connection at block 310, the MAC Frame 90 is encapsulated at block 312 for WAN transmission just as at step 194 in FIG. 10. The WAN Frame is then passed at block 314 to the Outbound Stream Manager 76.

Figure 18:
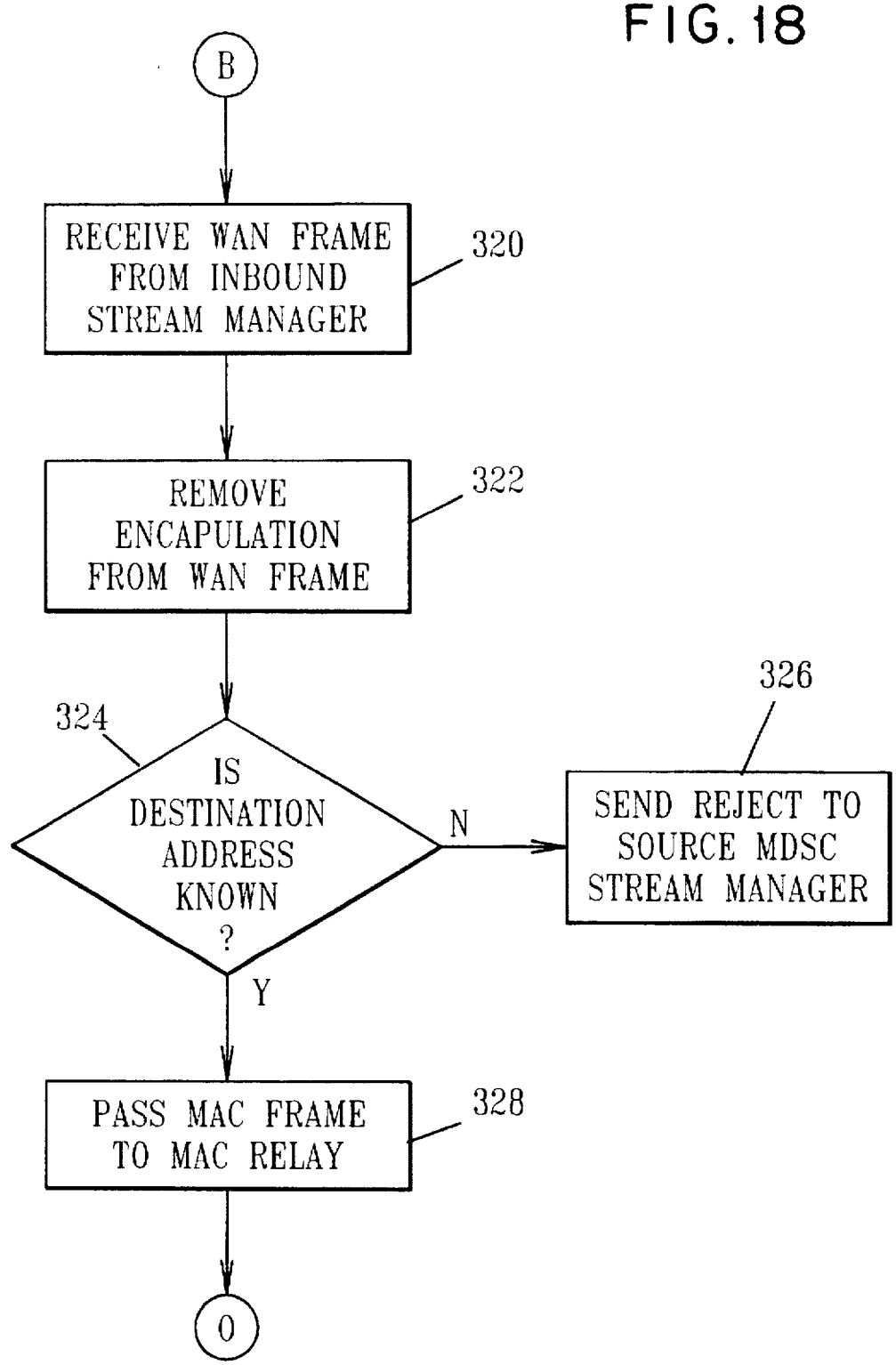
FIG. 18 is a flow chart of a WAB pseudo-LAN which is shown generally in FIG. 4.

FIG. 18 shows the WAB Inbound Pseudo-LAN 74. WAN Frames are received from the WAB Inbound Stream Manager 76 at block 320 and the WAN encapsulation is removed at block 322 to extract the MAC Frame 90. The destination address is checked at decision block 324, and, if not known, the Pseudo-LAN 74 sends a rejection to the MDSC Stream Manager 64 at block 326. If the destination address is known, then the MAC Frame 90 is passed at block 328 to the WAB Inbound MAC Relay 72.

Figure 19:
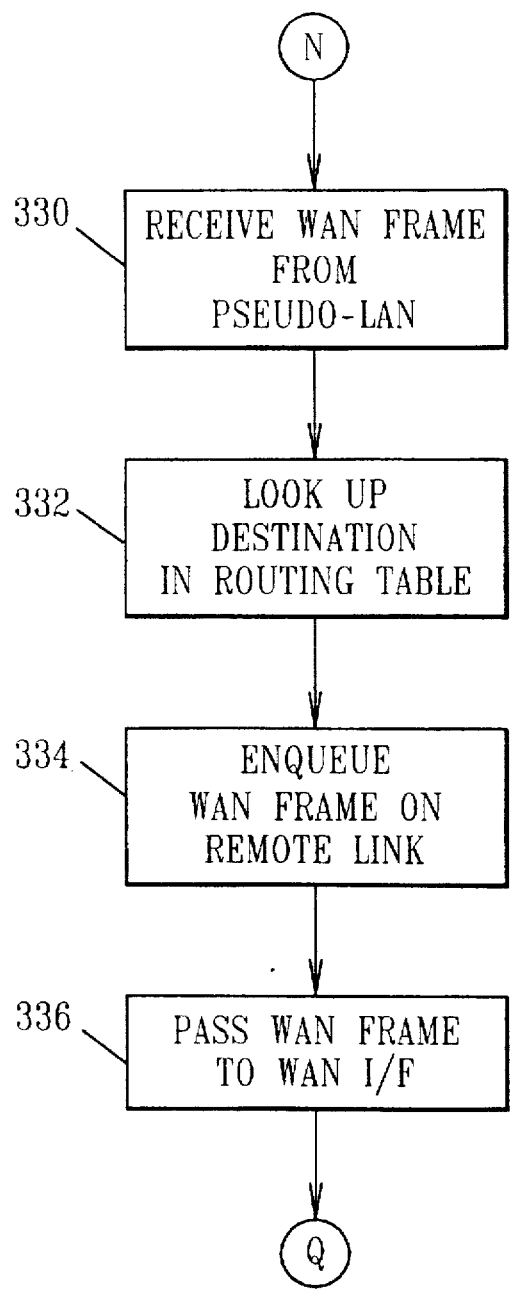
FIG. 19 is a flow chart of a WAB outbound stream manager which is shown generally in FIG. 4.
Figure 20:
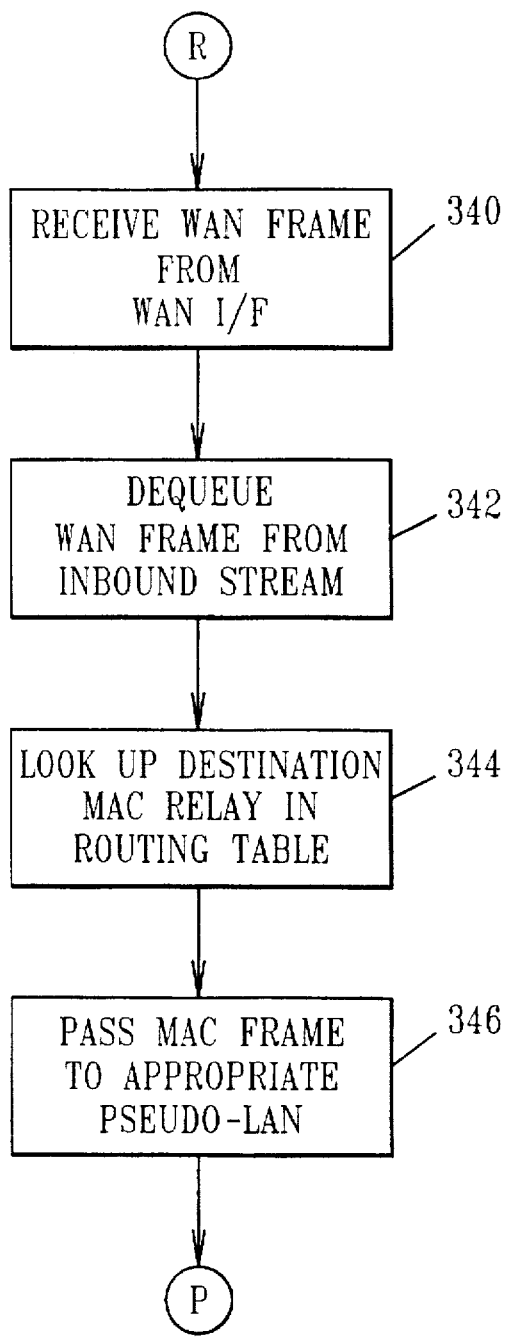
FIG. 20 is a flow chart of a WAB inbound stream manager which is shown generally in FIG. 4.

FIGS. 19 and 20 show the WAB Outbound and Inbound Stream Managers 76. Their in-line functions are exactly equivalent to those of the MDSC Inbound and Outbound Stream Managers 64 respectively (see descriptions for FIGS. 12 and 13). The WAB Stream Managers 74 have similar management functions to those of the MDSC Stream Managers 64, but the establishment of connections to remote MSs 40 has an additional complication, because the location of the MS 40 and hence the route to its host MDSC 42 may not be known.

FIG. 19 is a flow chart of the WAB outbound stream manager. A WAN frame is received from the WAB outbound pseudo-LAN (FIG. 7) at block 330. The destination of the WAN frame is then looked up in the routing table at block 322. The WAN frame is then enqued on the remote link at block 334, and passed to the WAN I/F at block 336.

FIG. 20 is a flow chart of the WAB inbound stream manager. A WAN frame is received from the WAN I/F at block 340. The WAN frame is then dequed at block 342. The destination MAC relay of the WAN frame is looked up in the routing table at block 344, and the MAC frame is passed to the appropriate pseudo-LAN (FIG. 18) at block 346.

Figure 21:
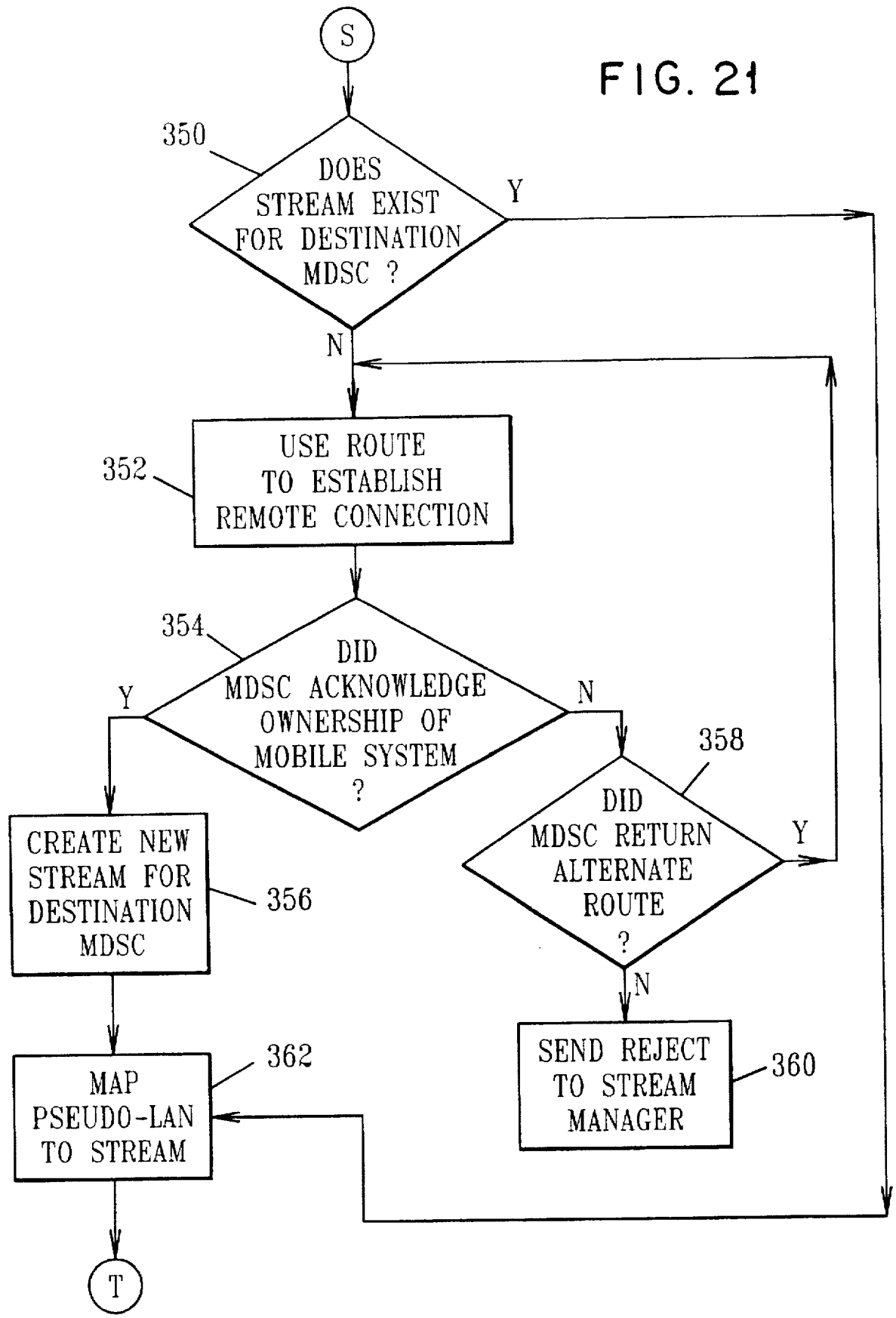
FIG. 21 is a flow chart of how to establish a connection to a remote MDSC via a WAB outbound stream manager.

FIG. 21 shows a method whereby the WAB Outbound Stream Manager 76 can attempt to establish connection to a remote MS 40. First at decision block 350 the destination address is checked to determine whether a stream exists for this route. If the stream exists then the new Pseudo-LAN is simply mapped to the existing stream at block 362. If there is no such stream, the Network Management 71 tables are examined for possible routes to the destination address. These tables are updated each time that the MS 40 is successfully accessed and may contain one or more routes to a given MS 40. The Stream Manager 76 may use one or more of various algorithms for selecting a route, for example:

1. The most recent route.
2. the most frequently found route.
3. a route marked as preferred, perhaps to a home location.

At block 352 it uses this route to contact a remote MDSC 42 and request the Shadow PC 62 or direct access for the destination address at decision block 354. If the attempt is successful, the Stream Manager 76 can create a new stream for this connection at block 356 and map it to the Pseudo-LAN at block 362. If the attempt is not successful, the remote MDSC 42 may determine at decision block 358 if an alternate route exists, and the Stream Manager 76 can re-try on this route (or it may choose an alternate route known from the Network Management 71 tables) by returning to block 352. If the Stream Manager exhausts all possible routes and fails to make connection to the destination address, it will send a rejection to the source address at block 360.

Having thus described our invention what we claim as new and desire to secure as Letters Patent, is:

1. A method of transmitting data via a cellular telephone communication system comprising the steps of:
   a. transmitting fragments of a LAN MAC frame over a wireless link from a source computer to a Cell Controller, CC, the source computer being equipped with a cellular wireless modem for use in the wireless link;
   b. transporting fragments of the LAN MAC frame from the CC to a Mobile Telephone Service Office, MTSO;
   c. routing the fragments of the LAN MAC frame through the MTSO to a Mobile Data Service Controller MDSC; and
   d. re-assembling the LAN MAC frame from successive fragments received at the MDSC.

2. The method as set forth in claim 1, and further including after step d, the steps of:
   a. recognizing from a destination MAC address in the re-assembled LAN MAC frame that a destination computer is another computer equipped with a cellular wireless modem in the same cell or another cell controlled by the same MTSO; and b. relaying the re-assembled LAN MAC frame to the destination computer.

3. The method as set forth in claim 2, wherein a second computer equipped with a wireless modem establishes and takes part in LAN communication via the cellular telephone system with another computer equipped with a wireless modem in the same cell or another cell controlled by the same MTSO.

4. The method as set forth in claim 1, and further including after step d, the steps of:
   a. recognizing from a destination MAC address in the re-assembled LAN MAC frame that a destination computer is not another computer equipped with a cellular wireless modem in the same cell or another cell controlled by the same MTSO; and
   b. relaying the re-assembled LAN MAC frame to a wide-area network interface module.

5. The method as set forth in claim 4, wherein the wide-area network interface module is a gateway into a packet-switched wide-area network including the step of:
   a. routing the LAN MAC frame through the wide-area network to a gateway into a Local Area Network, LAN, containing the destination computer.

6. The method as set forth in claim 5, including the step of:
   merging into a common stream through said wide-area network, said LAN MAC frame and another MAC frame having destination MAC addresses on a common remote LAN.

7. The method as set forth in claim 4, wherein the wide-area network interface module is a half-bridge interfaced to a connection-oriented wide-area network including the steps of:
   a. using one of an address and an identifier previously provided by the source computer to establish a connection through the wide-area network to a similar half-bridge which is attached to a Local Area Network, LAN, containing the destination computer.

8. The method as set forth in claim 7, including the steps of:
   a. routing the LAN MAC frame through the wide-area network to the half-bridge attached to the LAN containing the destination computer; and
   b. merging into a common stream through said wide-area network, said LAN MAC frame and another MAC frame having destination MAC addresses on a common remote LAN.

9. The method as set forth in claim 7, wherein a second computer equipped with a wireless modem establishes and takes part in LAN communication via the cellular telephone system with another computer which is attached to a remote LAN.

10. The method as set forth in claim 4, wherein the wide-area network interface module is a half-bridge interfaced to a connection-oriented data network, including the step of:
    a. using one of an address and an identifier previously provided by the source computer to establish a connection to a similar half-bridge which is attached to another MDSC which communicates with the destination computer via another cellular telephone MTSO and CC.

11. The method as set forth in claim 10, wherein a second computer equipped with a wireless modem establishes and takes part in LAN communication via the cellular telephone system with another computer equipped with a wireless modem in the same cell or another cell controlled by another MTSO.

12. The method as set forth in claim 1, and further including after step d, the steps of:
    a. recognizing from a destination MAC address in the re-assembled LAN MAC frame that a destination computer is not another computer equipped with a cellular wireless modem in the same cell or another cell controlled by the same MTSO; and
    b. relaying the re-assembled LAN MAC frame to a Shadow PC in the MDSC.

13. The method as set forth in claim 12, wherein the Shadow PC provides support for a source computer which is equipped with a wireless modem and which is taking part in LAN communication via the cellular telephone system with at least one other computer which is attached to a remote LAN.

14. The method as set forth in claim 12, wherein the Shadow PC provides a service to a source computer which is equipped with a wireless modem and which is taking part in LAN communication via the cellular telephone system with at least the Shadow PC.

15. The method according to claim 1, wherein another computer equipped with a cellular wireless modem informs the MDSC at the time of registration of the association between LAN MAC addresses it expects to employ and an identifier which is an address or identifying number of half-bridges between connection-oriented data networks and the LANs containing these LAN MAC addresses.

16. The method as set forth in claim 15, wherein the identifier identifies one or more LAN addresses as belonging to computers equipped with cellular wireless modems.

17. The method as set forth in claim 16, wherein the identifier is a network address.

18. The method as set forth in claim 16, wherein the identifier is a telephone number.

19. The method as set forth in claim 15, wherein the identifier is a network address.

20. The method as set forth in claim 15, wherein the identifier is a telephone number.

21. A method of transmitting data via a cellular telephone communication system comprising the steps of:
    a. receiving a LAN MAC frame at a Mobile Data Service Controller, MDSC;
    b. dividing the LAN MAC frame into fragments;
    c. routing the fragments of the LAN MAC frame through a Mobile Telephone Service Office, MTSO;
    d. transporting the fragments of the LAN MAC frame from the MTSO to a Cell Controller, CC; and
    e. transmitting the fragments of the LAN MAC frame over a wireless link from the CC to a computer, the computer being equipped with a cellular wireless modem for use in the wireless link.

22. A method of Local Area Network, LAN, communications between a first computer and at least one other computer comprising the steps of:
    a. initially establishing and taking part in LAN communication by a first computer with at least one other computer via either a wired connection between the first computer and a LAN or a local non-cellular wireless connection between the first computer and the LAN;
    b. using a cellular wireless modem attached to the first computer to establish a cellular LAN connection between the first computer and one or more of the same other computers for cellular communication;
    c. dropping the initial LAN communication via the wired or local non-cellular wireless connection with the first computer; and

21 d. maintaining the cellular LAN communication.

23. The method as set forth in claim 22, wherein said at least one other computer is equipped with a wireless modem for taking part in LAN communications with said first computer and is located in the same cell as said first computer or another cell controlled by the same Mobile Telephone Service Office (MTSO) as said first computer.

24. The method as set forth in claim 22, wherein said at least one other computer is equipped with a wireless modem for taking part in LAN communications with said first computer and is located in another cell controlled by a different Mobile Telephone Service Office MTSO as said first computer.

25. The method as set forth in claim 22, wherein said at least one other computer is attached to a remote LAN.

26. A method of Local Area Network, LAN, communications between a first computer and at least one other computer comprising the steps of:
  a. initially using a cellular wireless modem attached to a first computer to establish a cellular LAN connection between the first computer and a LAN for establishing and taking part in LAN communication with at least one other computer;
  b. establishing LAN communication between the first computer and one or more of the same other computers via either a wired connection between the first computer and the LAN or a local non-cellular wireless connection between the first computer and the LAN;
  c. dropping the initial cellular LAN connection; and
  d. maintaining the LAN communication via the wired or local wireless connection.

27. The method as set forth in claim 26, wherein said at least one other computer is equipped with a wireless modem for taking part in LAN communications with said first computer and is located in the same cell as said first computer or another cell controlled by the same Mobile Telephone Service Office (MTSO) as said first computer.

28. The method as set forth in claim 26, wherein said at least one other computer is equipped with a wireless modem for taking part in LAN communications with said first computer and is located in another cell controlled by a different Mobile Telephone Service Office (MTSO) as said first computer.

29. The method as set forth in claim 26, wherein said at least one other computer is attached to a remote LAN.

30. Apparatus for transmitting data via a cellular telephone communication system, comprising:
  a. means for transmitting fragments of a LAN MAC frame over a wireless link from a source computer to a Cell Controller, CC, the source computer being equipped with a cellular wireless modem for use in the wireless link;
  b. means for transporting fragments of the LAN MAC frame from the CC to a Mobile Telephone Service Office, MTSO;
  c. means for routing the fragments of the LAN MAC frame through the MTSO to a Mobile Data Service Controller, MDSC; and
  d. means for re-assembling the LAN MAC frame from successive fragments received at the MDSC.

31. The apparatus as set forth in claim 30, including:
  a. means for recognizing from a destination MAC address in the re-assembled LAN MAC frame that a destination computer is another computer equipped with a cellular wireless modem in the same cell or another cell controlled by the same MTSO; and

22 b. means for relaying the re-assembled LAN MAC frame to the destination computer.

32. The apparatus as set forth in claim 31, wherein a second computer equipped with a wireless modem establishes and takes part in LAN communication via the cellular telephone system with another computer equipped with a wireless modem in the same cell or another cell controlled by the same MTSO.

33. The apparatus as set forth in claim 30, including:
  a. means for recognizing from a destination MAC address in the re-assembled LAN MAC frame that a destination computer is not another computer equipped with a cellular wireless modem in the same cell or another cell controlled by the same MTSO; and
  b. means for relaying the re-assembled LAN MAC frame to a wide-area network interface module.

34. The apparatus as set forth in claim 33, wherein the wide-area network interface module is a gateway into a packet-switched wide-area network, including:
  a. means for routing the LAN MAC frame through the wide-area network to a gateway into a Local Area Network, LAN, containing the destination computer.

35. The apparatus as set forth in claim 34, including:
  means for merging into a common stream through said wide-area network, said LAN MAC frame and another MAC frame having destination MAC addresses on a same remote LAN.

36. The apparatus as set forth in claim 33, wherein the wide-area network interface module is a half-bridge interfaced to a connection-oriented wide-area network, including:
  a. means for using one of an address and an identifier previously provided by the source computer to establish a connection through the wide-area network to a similar half-bridge which is attached to a Local Area Network, LAN, containing the destination computer.

37. The apparatus as set forth in claim 36, wherein a second computer equipped with a wireless modem establishes and takes part in LAN communication via the cellular telephone system with another computer which is attached to a remote LAN.

38. The apparatus as set forth in claim 36, including:
  a. means for routing the LAN MAC frame through the wide-area network to the half-bridge attached to the LAN containing the destination computer; and
  b. means for merging into a common stream through said wide-area network, said LAN MAC frame and another MAC frame having destination MAC addresses on a common remote LAN.

39. The apparatus according to claim 30, wherein another computer equipped with a cellular wireless modem informs the MDSC at the time of registration of the association between LAN MAC addresses it expects to employ and an identifier which is an address or identifying number of half-bridges between connection-oriented data networks and the LANs containing these LAN MAC addresses.

40. The apparatus as set forth in claim 39, wherein the identifier identifies one or more LAN addresses as belonging to computers equipped with cellular wireless modems.

41. The apparatus as set forth in claim 40, wherein the identifier is a network address.

42. The apparatus as set forth in claim 40, wherein the identifier is a telephone number.

43. The apparatus as set forth in claim 39, wherein the identifier is a network address.

44. The apparatus as set forth in claim 39, wherein the identifier is a telephone number.

23

45. The apparatus as set forth in claim 33, wherein the wide-area network interface module is a half-bridge interfaced to a connection-oriented data network, including:
   a. means for using one of an address and an identifier previously provided by the source computer to establish a connection to a similar half-bridge which is attached to another MDSC which communicates with the destination computer via another cellular telephone MTSO and CC.

46. The apparatus as set forth in claim 45, wherein a second computer equipped with a wireless modem establishes and takes part in LAN communication via the cellular telephone system with another computer equipped with a wireless modem in the same cell or another cell controlled by another MTSO.

47. The apparatus as set forth in claim 30, including:
   a. means for recognizing from a destination MAC address in the re-assembled LAN MAC frame that a destination computer is not another computer equipped with a cellular wireless modem in the same cell or another cell controlled by the same MTSO; and
   b. means for relaying the re-assembled LAN MAC frame to a Shadow PC in the MDSC.

48. The apparatus as set forth in claim 47, wherein the Shadow PC provides support for a source computer which is equipped with a wireless modem and which is taking part in LAN communication via the cellular telephone system with at least one other computer which is attached to a remote LAN.

49. The apparatus as set forth in claim 47, wherein the Shadow PC provides a service to a source computer which is equipped with a wireless modem and which is taking part in LAN communication via the cellular telephone system with at least the Shadow PC.

50. Apparatus for transmitting data via a cellular telephone communication system, comprising:
   a. means for receiving a LAN MAC frame at a Mobile Data Service Controller, MDSC;
   b. means for dividing the LAN MAC frame into fragments;
   c. means for routing the fragments of the LAN MAC frame through a Mobile Telephone Service Office, MSTO;
   d. means for transporting the fragments of the LAN MAC frame from the MTSO to a Cell Controller, CC; and
   e. means for transmitting the fragments of the LAN MAC frame over a wireless link from the CC to a computer, the computer being equipped with a cellular wireless modem for use in the wireless link.

51. A system of Local Area Network, LAN, communications between a first computer and at least one other computer, comprising:
   a. means for initially establishing and taking part in LAN communication by a first computer with at least one other computer via either a wired connection between the first computer and a LAN or a local non-cellular wireless connection between the first computer and the LAN;

24 b. means for using a cellular wireless modem attached to the first computer to establish a cellular LAN connection between the first computer and one or more of the same other computers for cellular communication;
   c. means for dropping the initial LAN communication via the wired or local non-cellular wireless connection with the first computer; and
   d. means for maintaining the cellular LAN communication.

52. The system as set forth in claim 51, wherein said at least one other computer is equipped with a wireless modem for taking part in LAN communications with said first computer and is located in the same cell as said first computer or another cell controlled by the same Mobile Telephone Service Office (MTSO) as said first computer.

53. The system as set forth in claim 51, wherein said at least one other computer is equipped with a wireless modem for taking part in LAN communications with said first computer and is located in another cell controlled by a different Mobile Telephone Service Office (MTSO) as said first computer.

54. The system as set forth in claim 51, wherein said at least one other computer is attached to a remote LAN.

55. A system of Local Area Network, LAN, communications between a first computer and at least one other computer, comprising:
   a. means for initially using a cellular wireless modem attached to a first computer to establish a cellular LAN connection between the first computer and a LAN for establishing and taking part in LAN communication with at least one other computer;
   b. means for establishing LAN communication between the first computer and one or more of the same other computers via either a wired connection between the first computer and the LAN or a local non-cellular wireless connection between the first computer and the LAN;
   c. means for dropping the initial cellular LAN connection; and
   d. means for maintaining the LAN communication via the wired or local wireless connection.

56. The system as set forth in claim 55, wherein said at least one other computer is equipped with a wireless modem for taking part in LAN communications with said first computer and is located in the same cell as said first computer or another cell controlled by the same Mobile Telephone Service Office (MTSO) as said first computer.

57. The system as set forth in claim 55, wherein said at least one other computer is equipped with a wireless modem for taking part in LAN communications with said first computer and is located in another cell controlled by a different Mobile Telephone Service Office (MTSO) as said first computer.

58. The system as set forth in claim 55, wherein said at least one other computer is attach ed to a remote LAN.

\* \* \* \* \*